(12) United States Patent
Atcravi

(10) Patent No.: US 12,503,032 B2
(45) Date of Patent: Dec. 23, 2025

(54) MOTORHOME WITH EXPANDABLE BATHROOM

(71) Applicant: Itty Atcravi, La Jolla, CA (US)

(72) Inventor: Itty Atcravi, La Jolla, CA (US)

( * ) Notice: Subject to any disclaimer, the term of this patent is extended or adjusted under 35 U.S.C. 154(b) by 276 days.

(21) Appl. No.: 18/024,433

(22) PCT Filed: Oct. 5, 2022

(86) PCT No.: PCT/US2022/045816
§ 371 (c)(1),
(2) Date: Mar. 2, 2023

(87) PCT Pub. No.: WO2023/059745
PCT Pub. Date: Apr. 13, 2023

(65) Prior Publication Data
US 2024/0294105 A1 Sep. 5, 2024

Related U.S. Application Data

(60) Provisional application No. 63/254,072, filed on Oct. 9, 2021.

(51) Int. Cl.
*B60P 3/34* (2006.01)
*B60P 3/36* (2006.01)
*B60R 15/02* (2006.01)
*B60R 15/04* (2006.01)

(52) U.S. Cl.
CPC ...... *B60P 3/34* (2013.01); *B60P 3/36* (2013.01); *B60R 15/02* (2013.01); *B60R 15/04* (2013.01)

(58) Field of Classification Search
None
See application file for complete search history.

(56) References Cited

U.S. PATENT DOCUMENTS

| 3,659,894 | A | * | 5/1972 | Dodgen | B60P 3/32 296/165 |
| 6,098,346 | A | * | 8/2000 | Miller | B60P 3/36 296/22 |
| 9,597,994 | B1 | * | 3/2017 | Price | B60P 3/34 |
| 2004/0150240 | A1 | * | 8/2004 | Koren | B60P 3/34 296/26.01 |

(Continued)

FOREIGN PATENT DOCUMENTS

KR 102288969 * 8/2021

*Primary Examiner* — Joseph D. Pape
(74) *Attorney, Agent, or Firm* — Donn K. Harms

(57) ABSTRACT

A recreational vehicle configured as a motorhome has a cab section (102) containing a front seat (135), a bedroom (142) positioned substantially to one side of the motorhome rearward of the cab section (102), a retractable bed (162), a bathroom (143) positioned laterally opposite to the bedroom (142) and a sink (168) and a toilet (171). The motorhome also provides a rear lounge (144) positioned rearward of the bedroom (142) and the bathroom (143) and includes a dinette (178) and a kitchen unit (179). The bedroom (142) and the bathroom (143) are substantially expandable outwards from the exterior of the motorhome in opposing directions. The bathroom (143) is also configurable to translate inwards within the interior of the motorhome to enclose an area previously occupied by the bedroom (142).

17 Claims, 39 Drawing Sheets

(56) References Cited

U.S. PATENT DOCUMENTS

2006/0267363 A1* 11/2006 Crean .................. B60P 3/34
                                                                                 296/26.13
2015/0102632 A1* 4/2015 Pham .................. B60P 3/34
                                                                                 296/175

* cited by examiner

MOTORHOME WITH EXPANDABLE BATHROOM

CROSS-REFERENCE TO RELATED APPLICATION

This application claims the benefit of U.S. provisional patent application Ser. No. 63/254,072, filed on Oct. 9, 2021 which is incorporated herein in its entirety by this reference thereto.

BACKGROUND—FIELD OF INVENTION

The present invention relates generally to recreational vehicles such as motorhomes and caravans or travel trailers and the like, and specifically to small motorhomes of approximately the same lengths as medium-sized campervans, with retractable room extensions in the form of slides or slide-outs.

BACKGROUND—PRIOR ART

Manufacturers of recreational vehicles have always been trying to arrange as many desirable amenities as possible in a vehicle that is small enough to be easily driven, towed or parked on most public roads. Recreational vehicles with retractable room extensions in the form of slides or slide-outs have become commonplace during the past few decades. These include motorhomes and caravans or trailers as well as truck campers with slides containing a bed, a couch, a dinette, a kitchen unit, a refrigerator, a bathroom and a wardrobe. Campervans have also become more popular during the same period of time because they are more economical to use than larger motorhomes and their smaller sizes make them easier to drive and park.

Dynamax, Forest River, Four Winds, Jayco, Thor Industries and Winnebago built motorhomes with a large slide containing a sofa bed or Murphy bed, a dinette and a wardrobe on one side and no slide on the opposite side.

Host Campers built truck campers with a slide containing a dinette, a bathroom sink and a toilet on one side, and another slide containing a wardrobe, a refrigerator, a stove and kitchen sinks on the opposite side.

The popularity of cassette toilets makes it logical to install the toilet in a slide since this type of toilet is preferably installed adjacent to an exterior wall and does not require a holding tank under the floor.

Rexhall and Protec built motorhomes with "full-body slide rooms" with slides extending from just behind the front seats to the rear end of the vehicle. Beauer built motorhomes and caravans that triple in size using two overlapping slides, with one slide retracting over the exterior of the fixed part of the vehicle and the other slide retracting into the interior of the vehicle. Jayco also built fifth-wheel trailers with a bedroom slide positioned inside a larger slide.

Alfa Leisure had a patented design for a motorhome with a large slide with doors at opposite ends which are used as entry doors when the slide is in its extended position.

Peterson Industries built fifth-wheel trailers with an entry door in the outer wall of a slide, with entry steps which can be folded and stored on the outside of the entry door when not in use.

SAIC Motor built two-level motorhomes with slides on opposite sides as well as a retractable second level which is accessible by a lift or elevator at the rear end of the motorhome.

Roadtrek and Winnebago built campervans with a bathroom that is expandable inwards into a walking area with a floor board that can be removed or lifted to expose a shower pan underneath.

U.S. published application US20050161974A1, disclosed a couch which is stored in an under-floor compartment when not in use, as well as a slide containing a movable wardrobe which is kept over a bathtub or a shower stall when the slide is in its retracted position. These arrangements saved a considerable amount of space and made it possible to include more desirable amenities in a motorhome of approximately 6.1 m (20 feet) in length. However, none of the embodiments disclosed therein included a bedroom with a walk-around bed or an island bed that is accessible from three sides.

The forgoing examples of related recreational vehicle or motorhomes are intended to be illustrative and not exclusive, and they do not imply any limitations on the motorhome invention described and claimed herein. Various limitations of the related art will become apparent to those skilled in the art upon a reading and understanding of the specification below and the accompanying drawings.

Objects and Advantages

An object of the present invention is to provide as many desirable amenities as possible in recreational vehicles such as conventional motorhomes, to yield motorhomes substantially the same lengths as medium-sized campervans so that they can be easily driven and parked on most public roads. These amenities can include a bedroom with a bed that is accessible from three sides, a bathroom with a sink, a toilet, a shower stall and a wardrobe, a lounge with an entry door, a dinette for four, a kitchen unit with a sink, a stove, a large worktop or counter, a refrigerator and a couch or a recliner.

Although many large conventional motorhomes may include all of these amenities, the present expandable motorhome invention makes it possible to include them in a vehicle with an overall length which is substantially shorter than conventional motorhomes. This reduction in vehicle length is achieved through the efficient use of space and the provision of a bathroom which is expandable outwards towards the exterior of the motorhome as well as inwards within the interior of the motorhome.

Furthermore, while each embodiment of the present invention includes a bedroom which is connected to the cab section with rotatable front seats, the two areas may be readily combined to create a bedroom suite with a bed and two rearward-facing chairs.

Additionally, each embodiment preferably includes a Jack-and-Jill bathroom which is connected to both the bedroom and the rear lounge so that an occupants of the rear lounge can enter the bathroom without entering the bedroom.

The use of retractable and removable partitions makes it possible to combine the bedroom and the rear lounge to create a large open space which makes the interior of the motorhome roomier than those of other motorhomes of comparable lengths.

Another object of the present invention is to provide floor plans or layouts for a motorhome with all of the walking and standing areas thereof positioned outside the slides enabling expansion, thereby providing more headroom to these areas than the sitting and sleeping areas inside the slides.

It is also an object of the present invention to provide a motorhome with an alternative floor plan or layout with a larger lounge by including the main entry door and the kitchen unit in a slide which extends to the rear end of the motorhome even though this arrangement requires the occupants to traverse the interior of this slide to enter or exit the motorhome using the main entry door.

A further object of the present invention is to provide additional living space in a motorhome through the provision of a retractable rear enclosure and a covered roof deck. The retractable rear enclosure provides additional sleeping accommodation for two whereas the covered roof deck can be used for sleeping as well as lounging.

Each embodiment of the present invention preferably includes a slide containing a wardrobe which is positioned over a shower stall when the slide is in its retracted position, as well as a recliner or a couch which can be folded and stored in an under-floor compartment.

Also, it is to be understood that the phraseology and terminology employed herein are solely for the purpose of description, and should not be regarded as limiting. As such, those skilled in the art will appreciate that the conception upon which this disclosure is based, may readily be utilized as a basis for other motorhomes which can be reconfigured to provide more living space. It is important, therefore, that the embodiments, objects and claims herein, be regarded as including any and all such equivalent construction and methodology insofar as they do not depart from the spirit and scope of the present invention.

SUMMARY OF INVENTION

Each embodiment of the present invention discloses a recreational vehicle such as a motorhome with a cab section containing front seats, an over-cab section positioned above the cab section, a bedroom positioned to one side of the motorhome rearward of the cab section, a bathroom positioned laterally opposite to the bedroom, and a rear lounge positioned rearward of the bedroom and the bathroom. Each embodiment also preferably includes a bedroom-side retractable room extension or slide containing a retractable bed and a dinette, and a bathroom-side retractable room extension or slide containing a wardrobe, a toilet, a bathroom sink and a refrigerator. Additionally, the rear lounge in each embodiment includes an entry door, a kitchen unit with a sink and a stove, and a foldable recliner or couch that can be stored in an under-floor compartment when not in use.

The bathroom in each embodiment is expandable outwards towards the exterior of the motorhome as well as inwards into the interior of the motorhome. Multi-fold doors are used for expanding the bathroom inwards into an area previously occupied by the bedroom so that the bathroom sink and the toilet can be used with the slides retracted.

The bathroom of the first, third and fourth embodiments includes a vanity unit with a bathroom sink whereas the bathroom of the second embodiment includes a pivotable bathroom sink that is movable between a first position above the toilet and a second position just outside the interior of the bathroom-side slide.

The third embodiment also includes a retractable rear enclosure and a roof deck with a retractable deck cover. The fourth embodiment includes a larger rear lounge with both slides extending to the rear end of the motorhome so that the main entry door and the kitchen unit are parts of the bathroom-side slide.

DETAILED DESCRIPTION OF INVENTION

Description of First Embodiment

Figure 1:
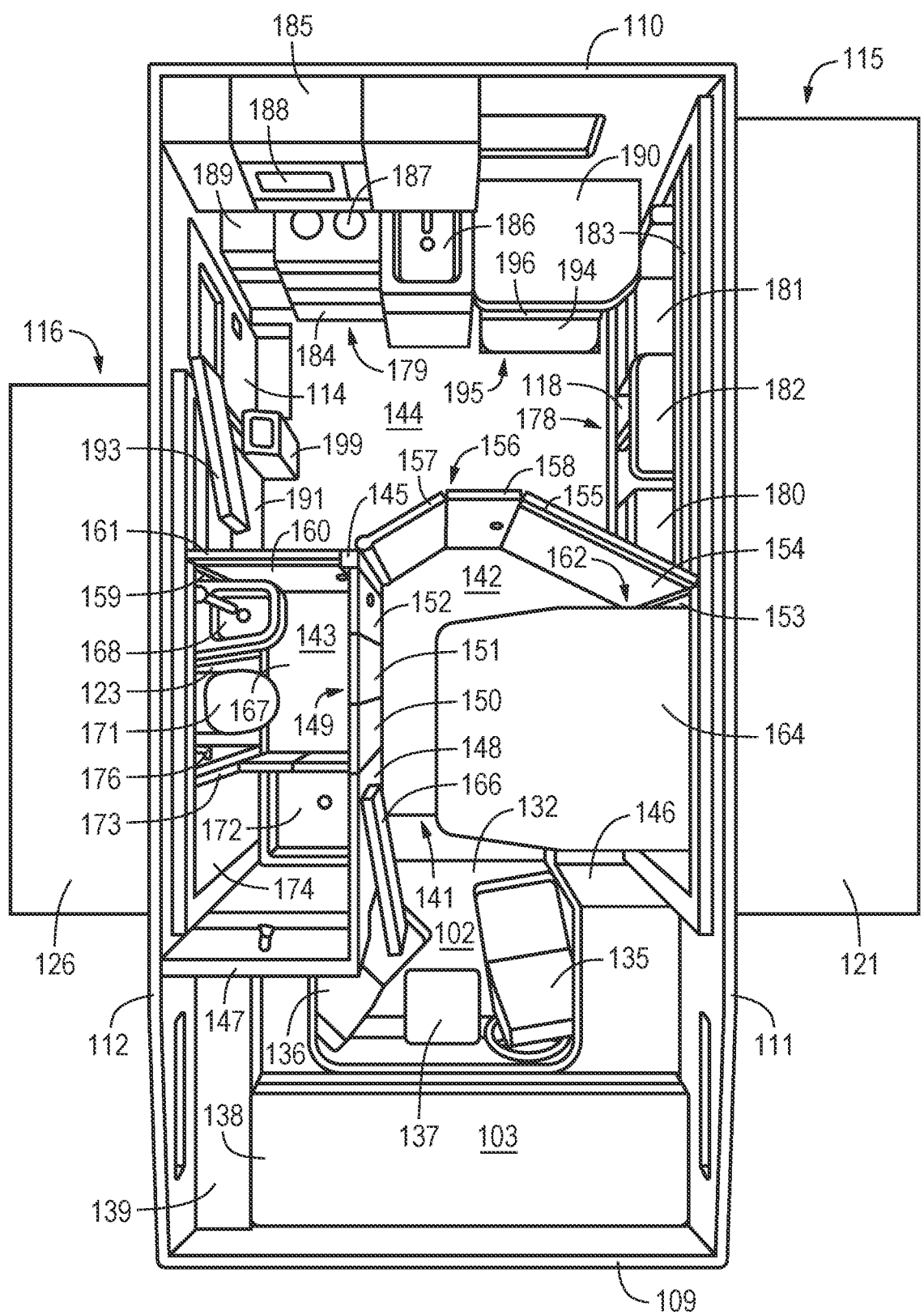
FIG. 1 is a perspective top view of the interior of the first embodiment with slides 115, 116 extended, over-cab mattress 138 folded, front seats 135, 136 facing rearwards, main bed 162 extended, dinette 178 configured for dining, and retractable worktop 190 raised for cooking.

FIGS. 1-18 show the motorhome of a first embodiment which is approximately 6 m (19.7 feet) in length, 2.3 m (7.6 feet) in width and 3 m (9.9 feet) in height in its fully retracted configuration without an awning, a roof-access ladder or an air conditioner.

The motorhome of the first embodiment includes a front end 101, a cab section 102, an over-cab section 103, a main section 104, and four wheels 105, 106, 107, 108, although a different chassis with dual rear wheels may be used. Over-cab section 103 is located above cab section 102 whereas main section 104 is defined as the section of the motorhome rearward of cab section 102.

The body of the motorhome includes a front wall 109, a rear end wall 110, a fixed left side wall 111, a fixed right side wall 112, a roof 113, a main entry door 114, a left slide 115, and a right slide 116. Left slide 115 is also referred to as "bedroom-side slide" or "bedroom-side retractable room extension" whereas right slide 116 is also referred to as "bathroom-side slide" or "bathroom-side retractable room extension".

Left slide 115 includes an outer wall 117, a floor 118, a forward wall 119, a rear wall 120, and a roof 121. Right slide 116 includes an outer wall 122, a floor 123, a forward wall 124, a rear wall 125, and a roof 126. Retractable steps 127 are provided under main entry door 114.

Figure 15:
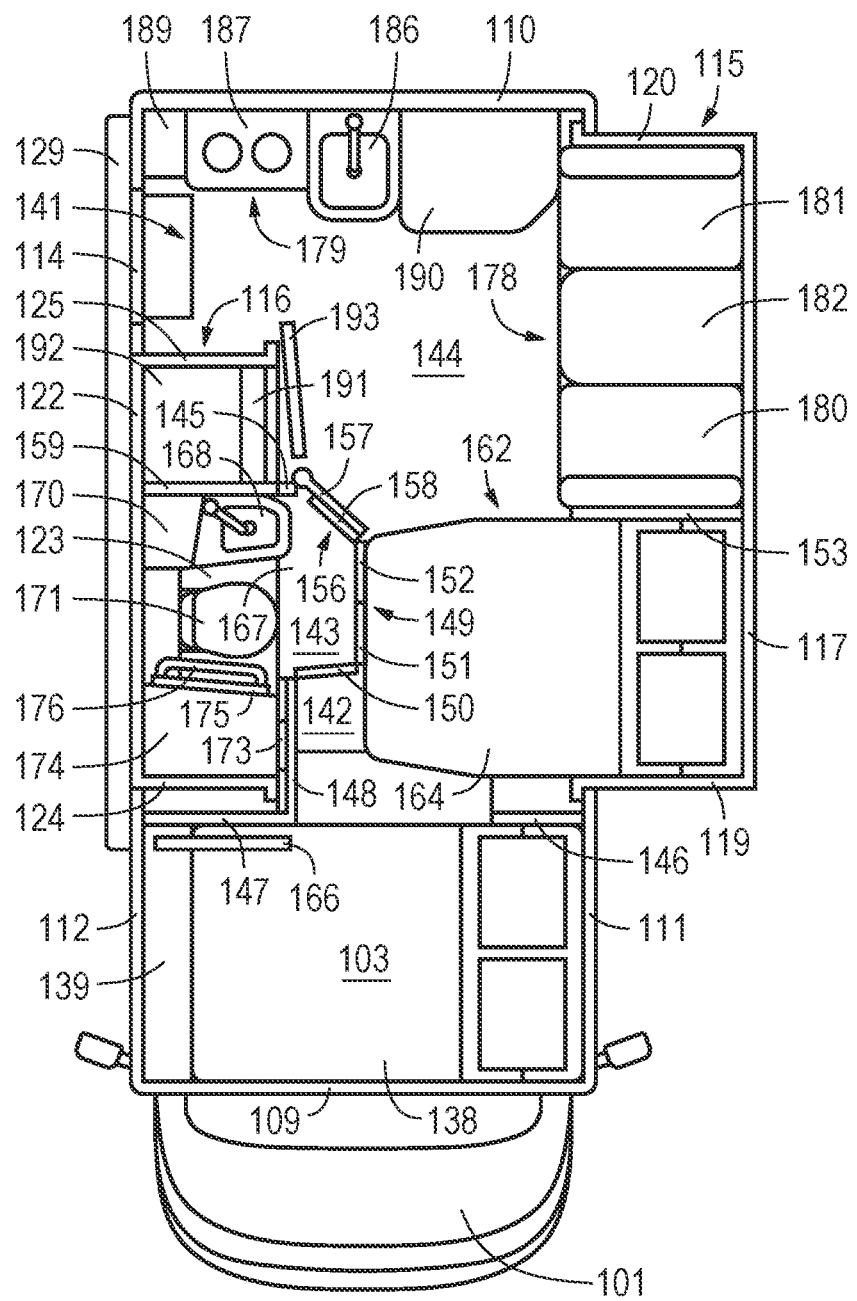
FIG. 15 is a plan view of the first embodiment with left slide 115 extended and right slide 116 retracted, over-cab mattress 138 and main bed 162 extended, bathroom 143 partially extended inwards, dinette 178 configured for dining, and retractable worktop 190 raised for cooking.
Figure 16:
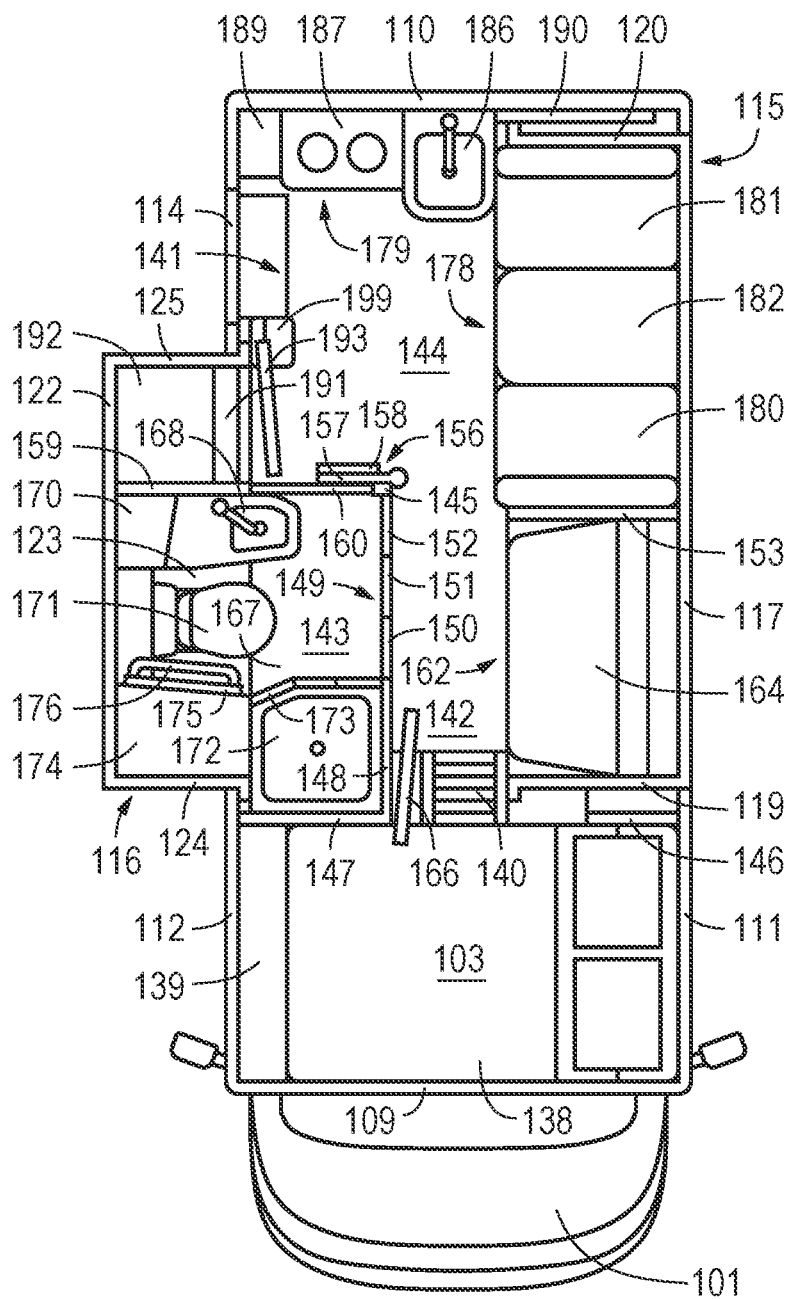
FIG. 16 is a plan view of the first embodiment with left slide 115 retracted and right slide 116 extended, over-cab mattress 138 extended, main bed 162 configured as a couch, dinette 178 configured for dining, and retractable worktop 190 lowered.

The motorhome is shown with slides 115, 116 extended in FIGS. 1, 4, 8, 11, 12, 13 and 14, and shown with slides 115, 116 retracted in FIGS. 2, 3, 7, 9 and 10. FIG. 15 shows the motorhome with left slide 115 extended and right slide 116 retracted whereas FIG. 16 shows the motorhome with left slide 115 retracted and right slide 116 extended.

An optional roof-access ladder 128 is mounted to rear end wall 110 and roof 113. An optional awning 129 is mounted to fixed right side wall 112 although a roof-mounted awning may be used. An air conditioner 130 and a hatch 131 are provided on roof 113.

Cab section 102 includes a lowered floor 132, front doors 133, 134, front seats 135, 136, and a removable table 137. Front seats 135, 136 are shown facing forward in FIGS. 9, 17 and 18, and shown facing rearward in FIGS. 1 and 11.

Over-cab section 103 includes an over-cab mattress 138 which can be extended for use or folded in half to provide standing room above lowered floor 132. Over-cab mattress 138 is shown in its extended configuration in FIGS. 2, 10, 12, 13, 14, 15, 16, 17 and 18, and shown in its folded configuration in FIGS. 1, 9 and 11. An over-cab storage compartment 139 and a removable bed-access ladder 140 are also provided.

Main section 104 includes a main floor 141 which is positioned substantially higher than lowered floor 132 to provide more usable space underneath and to avoid having protruding wheel wells which would complicate the construction of slides 115, 116.

Main section 104 also includes a bedroom 142, a bathroom 143, and a rear lounge 144 which are also referred to as a first room, a second room and a third room in the respective order. A column 145 is mounted to main floor 141 and roof 113. Bedroom 142 is partially separated from cab section 102 and the exterior of the motorhome by a forward bedroom wall 146. Bathroom 143 is separated from cab section 102, over-cab section 103, and the exterior of the motorhome by a forward bathroom wall 147.

As shown in FIGS. 1, 11, 12 and 16, bedroom 142 and bathroom 143 can be separated by an interior bathroom wall 148 and a tri-fold bathroom door 149 which includes a first panel 150, a second panel 151, and a third panel 152. Interior bathroom wall 148 and panels 150, 151, 152 are connected by 180-degree hinges in the obvious manner.

As shown in FIGS. 1, 11, 12 and 18, bedroom 142 and rear lounge 144 can be separated by a left-slide partition 153, a slidable bedroom wall 154, a retractable top panel 155, and a bi-fold bedroom door 156 which includes a first panel 157 and a second panel 158. Second panel 158 is connected to first panel 157 by a 180-degree hinge whereas first panel 157 can be pivoted up to 270 degrees between the position shown in FIG. 2 and the position shown in FIGS. 13 and 16.

Figure 18:
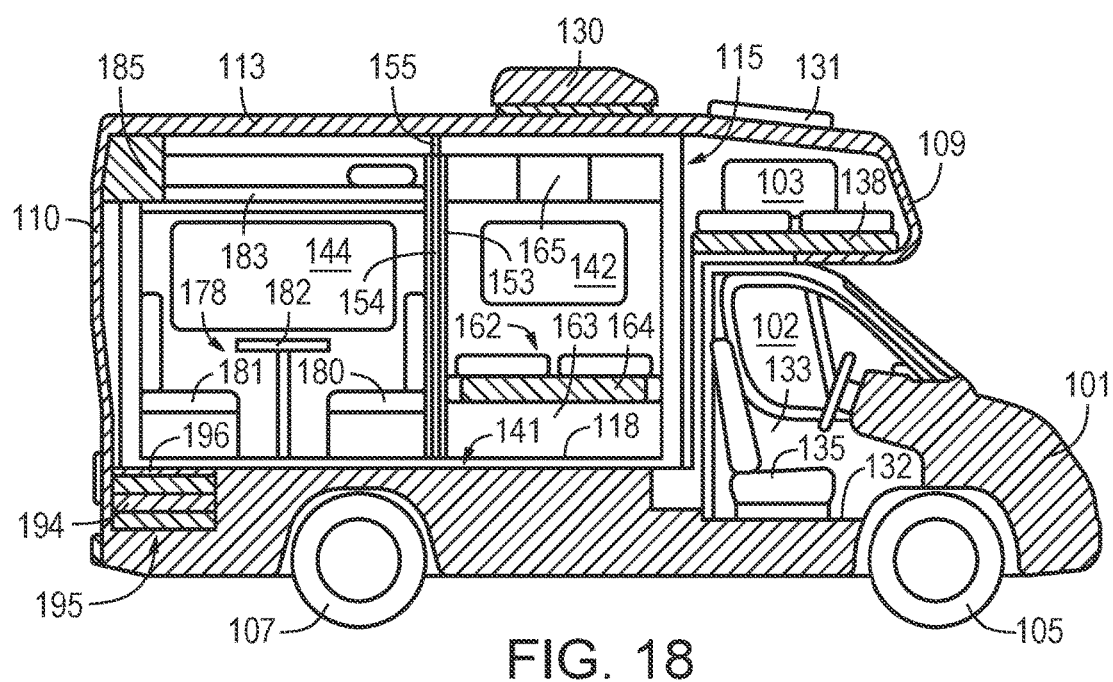
FIG. 18 is a sectional right side view of the first embodiment taken along the line 18-18 in FIG. 8 with main bed 162 extended and dinette 178 configured for dining.

Slidable bedroom wall 154 can be retracted and stored inside left-slide partition 153. Retractable top panel 155 is used for covering the gap between the top of slidable bedroom wall 154 and the underside of roof 113 when slidable bedroom wall 154 is in its extended position as shown in FIGS. 1 and 18. Retractable top panel 155 may be removable or retractable into a slot inside slidable bedroom wall 154. Alternatively it may be hinged to roof 121 of left slide 115 so that it can be easily moved out of the way. Right slide 116 contains a right-slide partition 159. The extension of right slide 116 opens up a doorway between column 145 and right-slide partition 159 which can be closed with a slidable bathroom door 160 as shown in FIGS. 1, 11, 12, 13, 14 and 16.

Slidable bathroom door 160 can be retracted and stored inside right-slide partition 159 when not in use. A retractable top panel 161 is used for covering the gap between the top of slidable bathroom door 160 and the underside of roof 113 and may be retracted in the same way as retractable top panel 155 when not in use. The gaps under slidable bedroom wall 154 and slidable bathroom door 160 may be covered in the same manner or left open for ventilation.

Door and wall panels may be secured in their open and closed positions with bolts that engage with main floor 141 or the underside of roof 113. Flush ring pulls or handles may be used for both hinged and slidable panels. Alternatively, accordion doors may be used in place of slidable bedroom wall 154 and slidable bathroom door 160.

Figure 2:
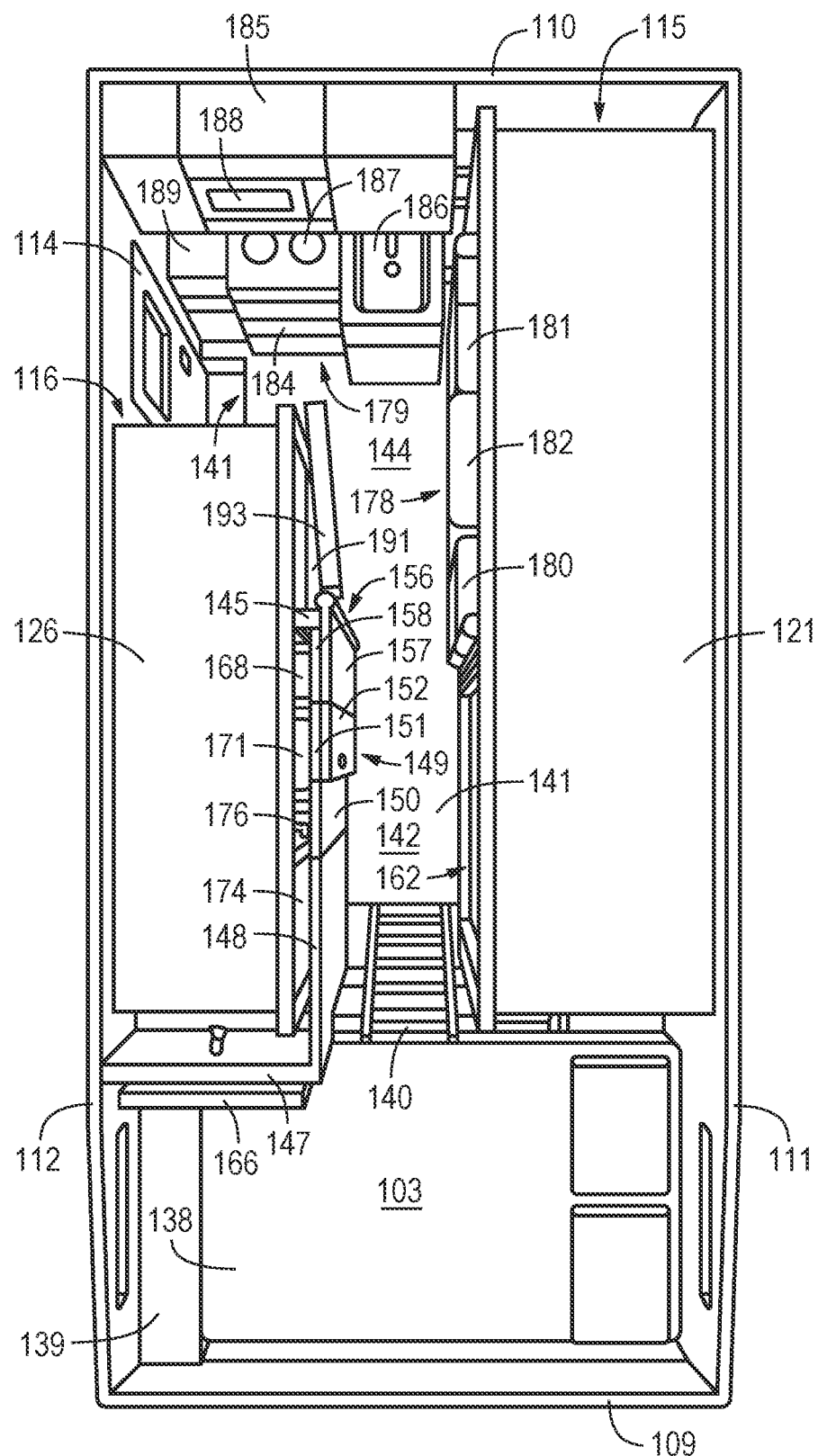
FIG. 2 is a perspective top view of the interior of the first embodiment with slides 115, 116 retracted, over-cab mattress 138 extended, main bed 162 configured as a couch, bathroom 143 fully retracted, and dinette 178 configured for dining.
Figure 3:
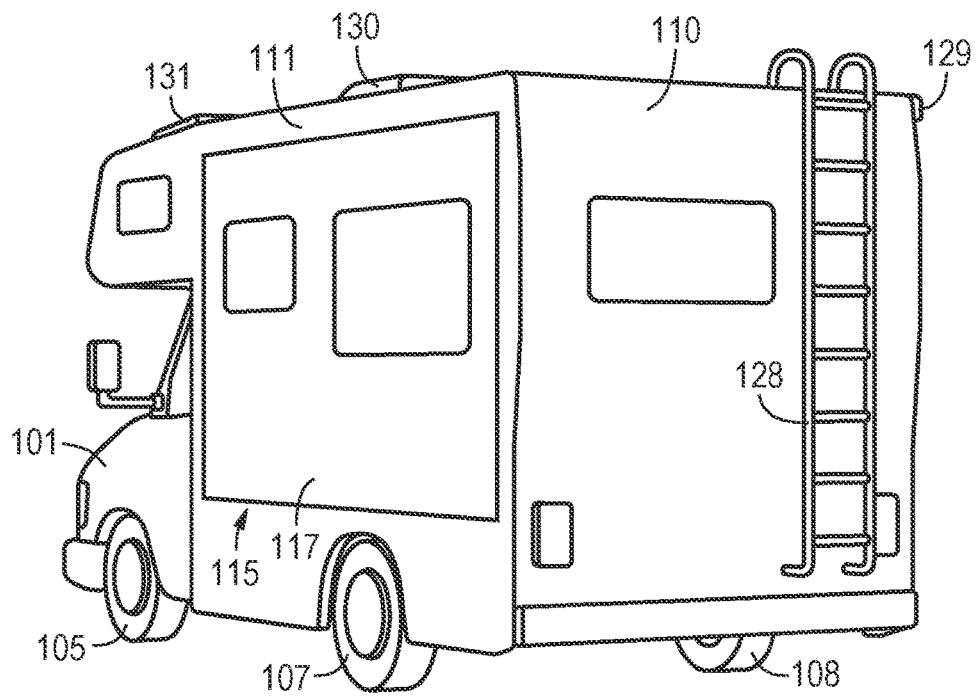
FIG. 3 is perspective view of the exterior of the first embodiment showing the left side and the rear end with left slide 115 retracted.

FIG. 2 shows that there is a gap between roof 126 of right slide 116 and doors 149, 156 when right slide 116 is in its retracted position so that an air vent for bathroom 143 may be installed above this gap on the underside of roof 113.

Bedroom 142 contains a retractable main bed 162 which includes a bed base 163 and a main-bed mattress 164. Bed base 163 also serves as a storage cabinet which may be accessible from the outside of the motorhome as well as from the inside. Main-bed mattress 164 can be extended as shown in FIGS. 1, 11, 12, 15 and 18, or folded to convert main bed 162 into a couch as shown in FIGS. 2, 9, 10, 13, 14 and 16. Alternatively, a sofa bed, a Murphy bed or any other suitable type of retractable bed may be used. A slide within a slide may also be installed so that main bed 162 can be made longer and extended further away from bathroom 143.

An overhead bedroom cabinet 165 and a bedroom television 166 are also provided. Bedroom television 166 is movable between an in-use position adjacent to interior bathroom wall 148 and a retracted position inside over-cab section 103.

Figure 11:
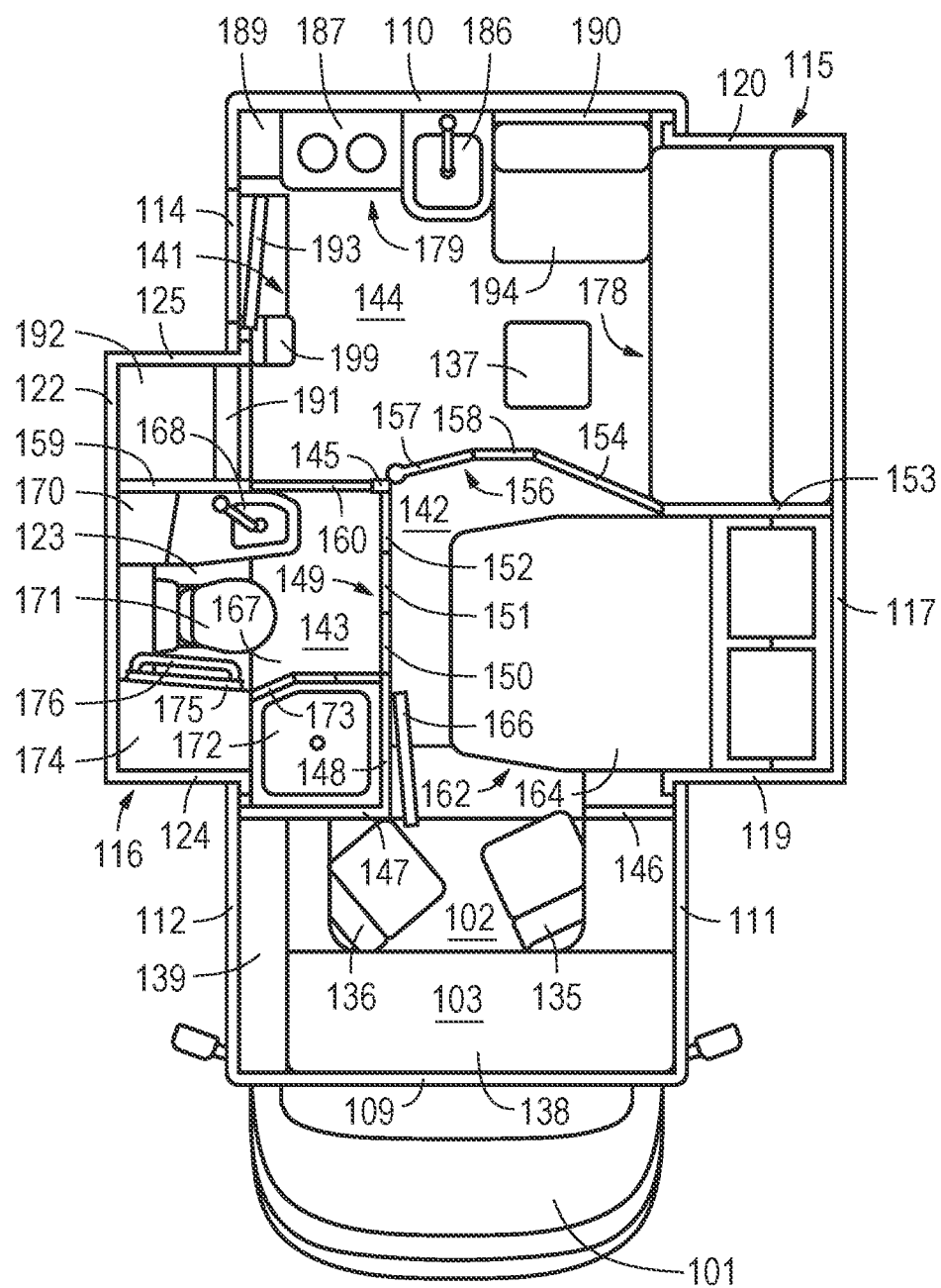
FIG. 11 is a plan view of the first embodiment with slides 115, 116 extended, over-cab mattress 138 folded, front seats 135, 136 facing rearwards, main bed 162 extended, dinette 178 joined with recliner 194 to form an L-shape seating arrangement, and retractable worktop 190 lowered.

With left slide 115 extended, bedroom 142 is readily combined with cab section 102 and over-cab section 103 to create a bedroom suite with front seats 135, 136 facing rearwards and over-cab mattress 138 folded as shown in FIGS. 1 and 11.

Bathroom 143 includes a bathroom floor 167 which is a section of main floor 141. Bathroom floor 167 can assume different shapes and sizes according to the positions of tri-fold bathroom door 149 and bi-fold bedroom door 156 which separate bathroom 143 from bedroom 142. Bathroom 143 contains a retractable sink 168, a vanity unit 169, a medicine cabinet 170, and a retractable toilet 171, which are parts of right slide 116. A shower pan 172 is installed at the forward end of bathroom 143 with a shower door 173 hinged to interior bathroom wall 148. Right slide 116 also includes a storage compartment in the form of a wardrobe 174 with a hinged wardrobe door 175 that can be swung open over toilet 171. A towel rack 176 is mounted to wardrobe door 175 and a tissue holder 177 is provided under sink 168.

Sink 168 and toilet 171 can be moved by small distances away from outer wall 122 of right slide 116 from their retracted positions into their extended positions. Although a fixed bathroom sink and a fixed toilet may be used, retractable sink 168 and retractable toilet 171 can be easier to use in their extended positions without the user's head touching roof 126 of right slide 116. Sink 168 is shown in its retracted position in FIGS. 2, 9, 14 and 15, and shown in its extended position in FIGS. 1, 10, 11, 12, 13 and 16. Toilet 171 is shown in its retracted position in FIGS. 2, 9 and 15, and shown in its extended position in FIGS. 1, 10, 11, 12, 13, 14 and 16.

As shown in FIG. 2 with right slide 116 retracted, tri-fold bathroom door 149 and bi-fold bedroom door 156 can be retracted with third panel 152 of tri-fold bathroom door 149 folded against second panel 151 and second panel 158 of bi-fold bedroom door 156 folded against first panel 157. In this configuration, bathroom 143 assumes its smallest size and is not meant to be used with an occupant inside.

As shown in FIGS. 1, 11, 12, 13 and 16, the extension of right slide 116 expands bathroom 143 outwards and uncovers a large section of bathroom floor 167 as well as shower pan 172 so that sink 168 and toilet 171 can be used in their extended positions.

As shown in FIGS. 9, 10, 14 and 15, tri-fold bathroom door 149 and bi-fold bedroom door 156 can be extended to form a partition for expanding bathroom 143 inwards into an area previously occupied by bedroom 142.

Figure 9:
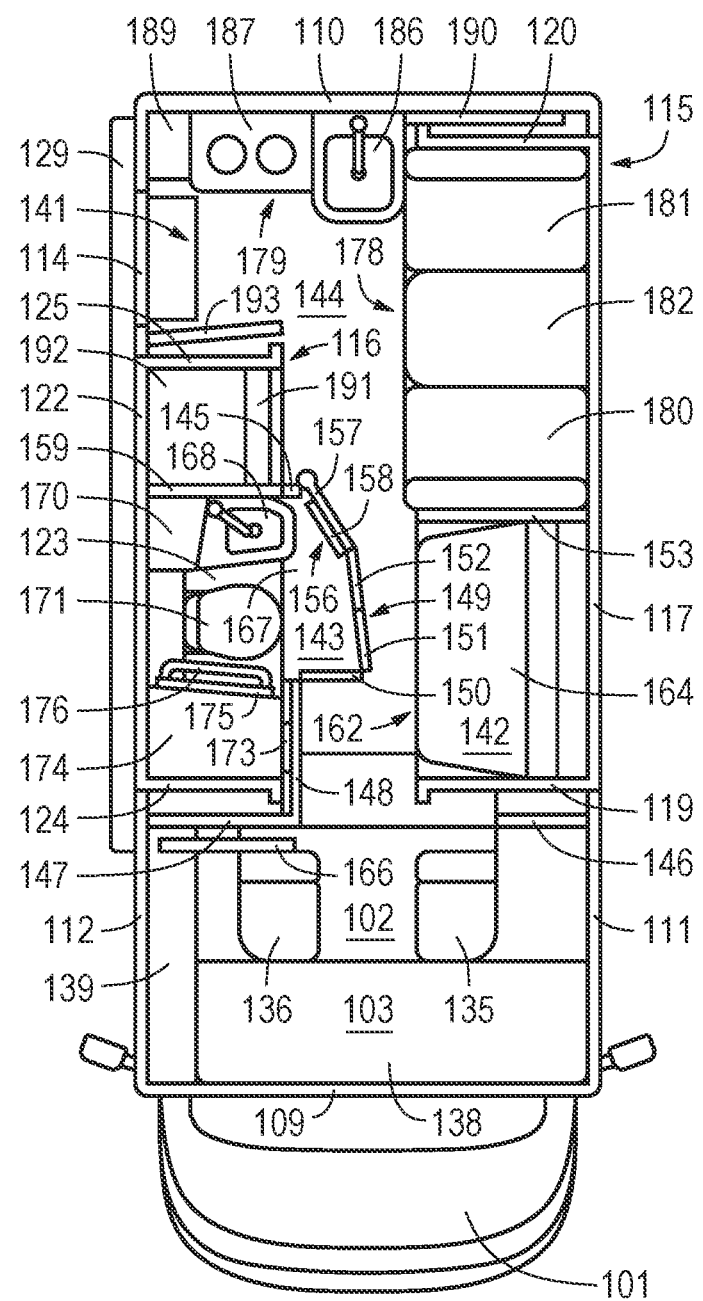
FIG. 9 is a plan view of the first embodiment with slides 115, 116 retracted, over-cab mattress 138 folded, front seats 135, 136 facing forward, main bed 162 configured as a couch, bathroom 143 partially extended inwards, dinette 178 configured for dining, and retractable worktop 190 lowered.

In FIG. 9, with slides 115, 116 retracted, tri-fold bathroom door 149 and bi-fold bedroom door 156 are extended to expand bathroom 143 inwards just enough to make sink 168 and toilet 171 usable in their retracted positions while leaving sufficient space outside bathroom 143 for the occupants to walk between cab section 102 and rear lounge 144.

Figure 10:
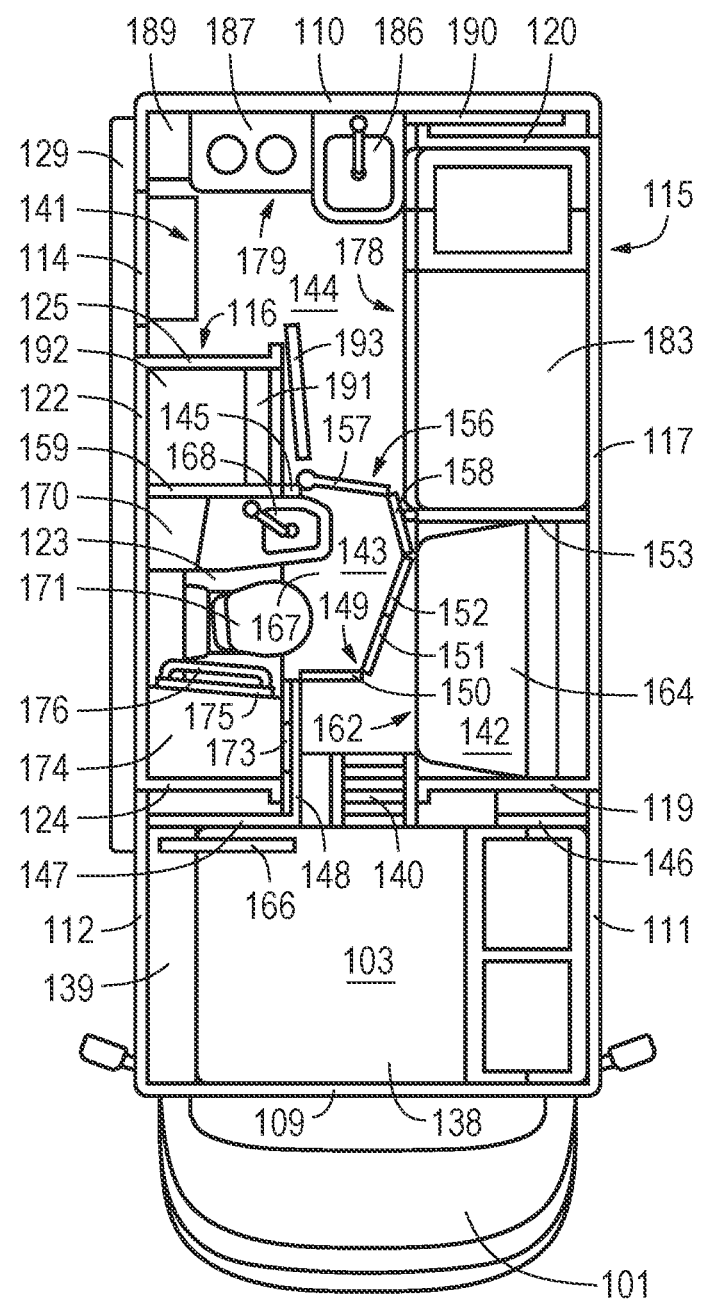
FIG. 10 is a plan view of the first embodiment with slides 115, 116 retracted, over-cab mattress 138 extended, main bed 162 configured as a couch, bathroom 143 fully extended inwards, dinette 178 configured as a bed, drop-down bed 183 set up for sleeping, and retractable worktop 190 lowered.

In FIG. 10, tri-fold bathroom door 149 and bi-fold bedroom door 156 are extended to expand bathroom 143 further inwards so that sink 168 and toilet 171 can be easily used in their extended positions. This configuration provides two enclosed sleeping areas with separate entry doors while keeping slides 115, 116 in their retracted positions.

Figure 14:
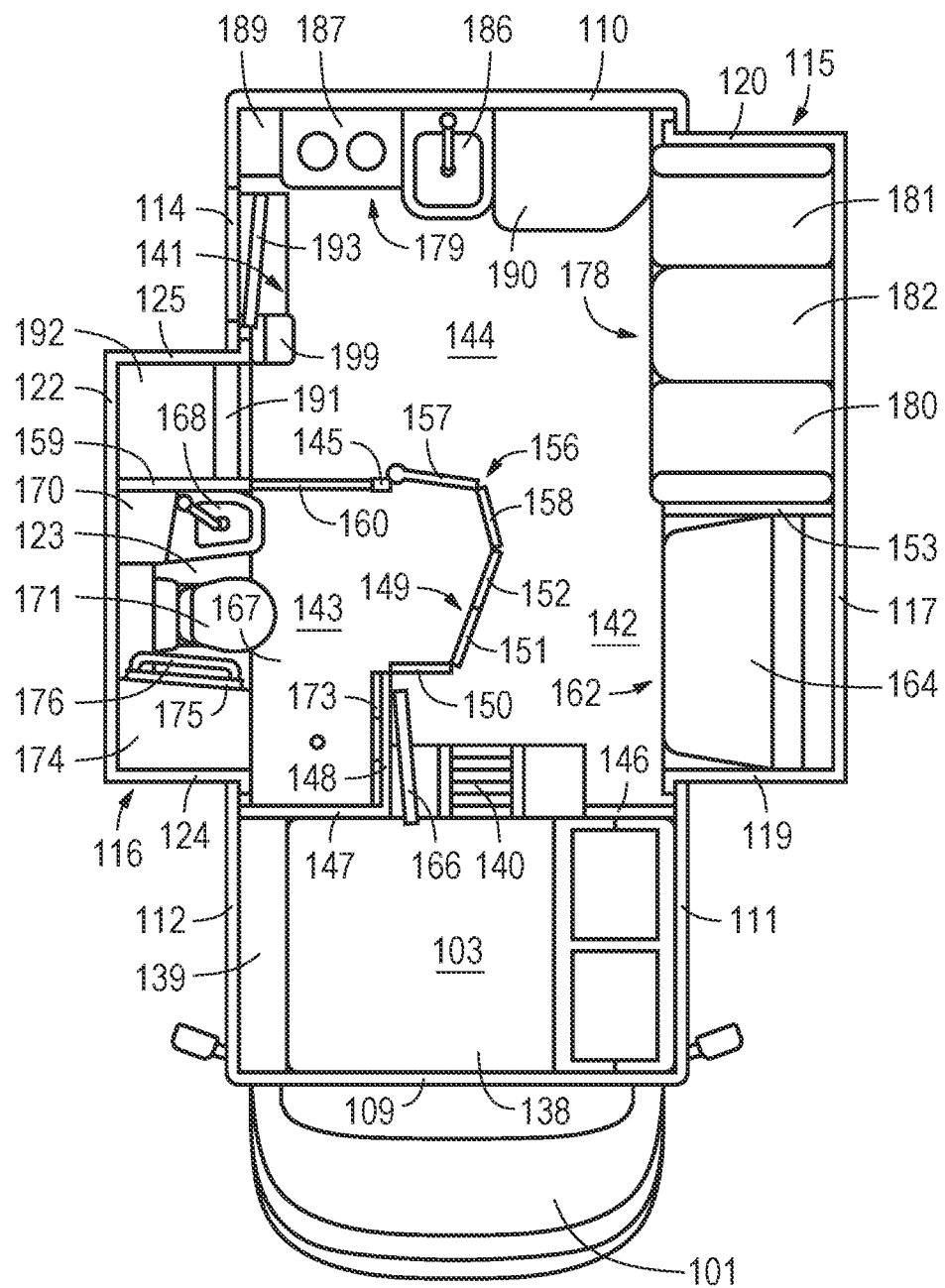
FIG. 14 is a plan view of the first embodiment with slides 115, 116 extended, over-cab mattress 138 extended, main bed 162 configured as a couch, bathroom 143 fully extended inwards and outwards, shower pan 172 removed, dinette 178 configured for dining, and retractable worktop 190 raised for cooking.

As shown in FIG. 14, bathroom 143 can be extended inwards and outwards at the same time so that there is enough room to accommodate a foldable bathtub or a wheelchair.

With left slide 115 extended and right slide 116 retracted, tri-fold bathroom door 149 and bi-fold bedroom door 156 can be arranged to make sink 168 and toilet 171 usable in their retracted positions with main bed 162 extended as shown in FIG. 15.

Figure 13:
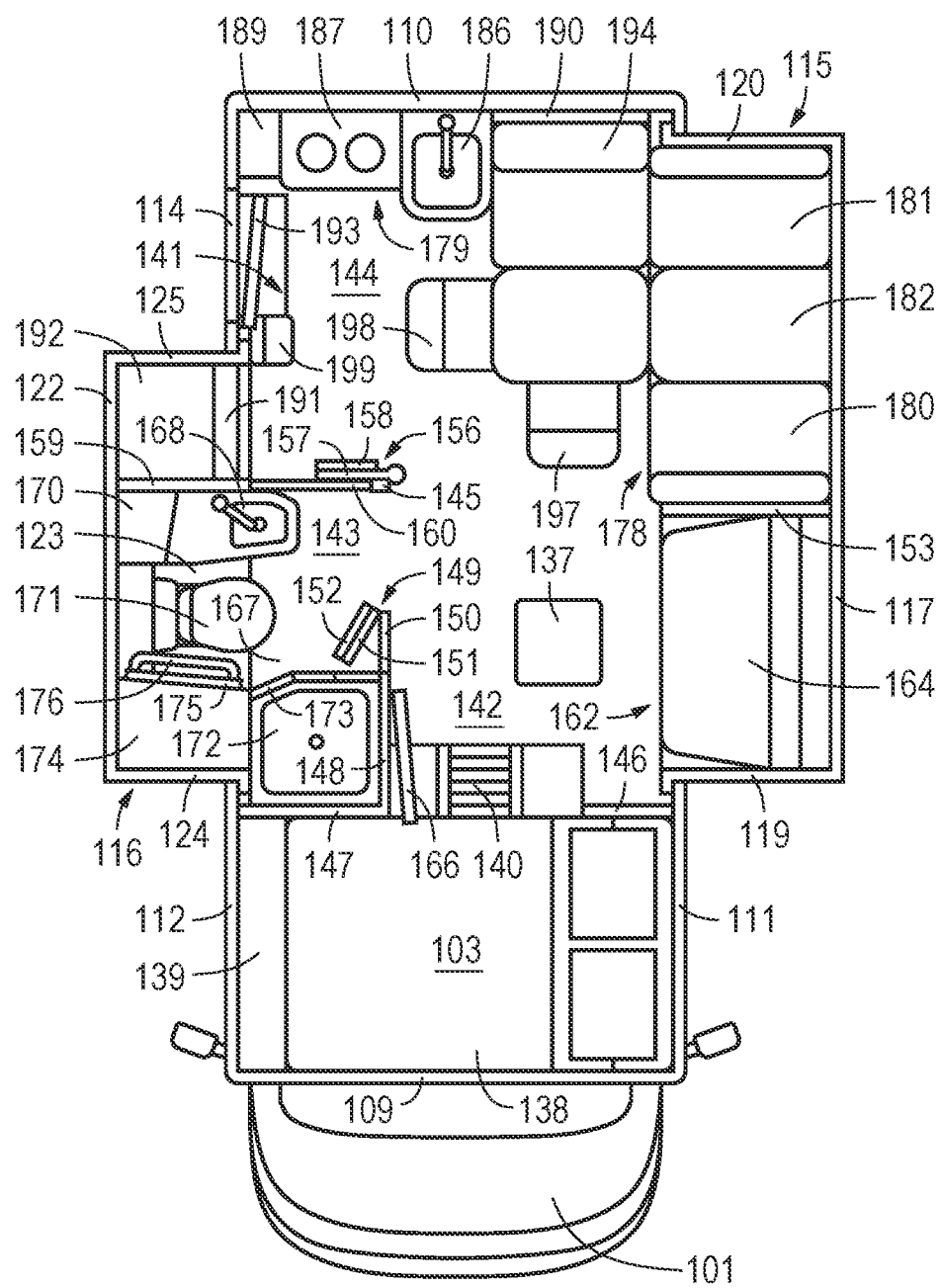
FIG. 13 is a plan view of the first embodiment with slides 115, 116 extended, over-cab mattress 138 extended, main bed 162 configured as a couch, dinette 178 and recliner 194 configured for dining with dining table 182 extended, folding chairs 197, 198 set up for use, and retractable worktop 190 lowered.

With first panel 150 of tri-fold bathroom door 149 kept in its closed position, second panel 151 and third panel 152 can be used as a bi-fold bathroom door which opens inwards into bathroom 143 as shown in FIG. 13.

Figure 12:
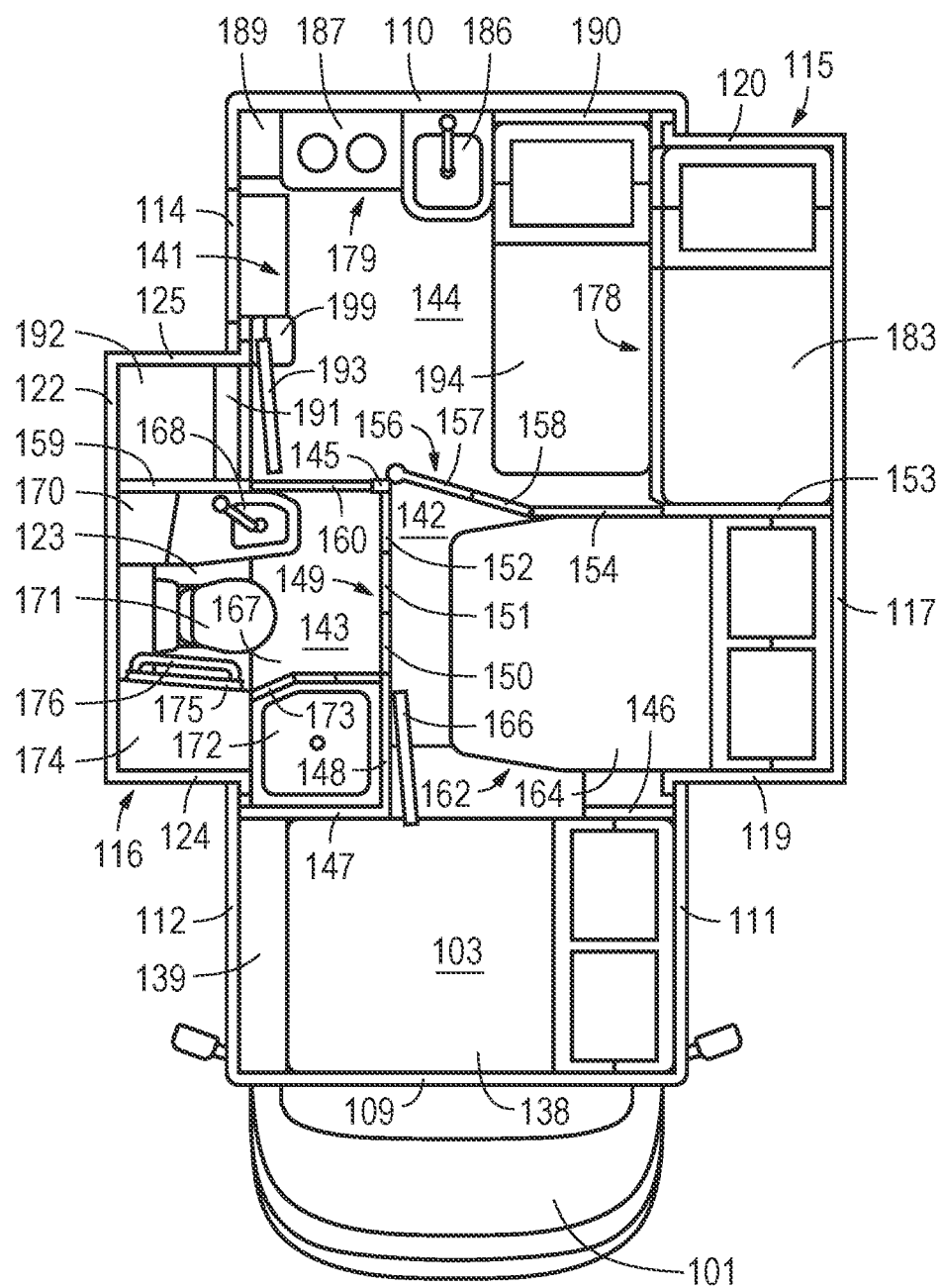
FIG. 12 is a plan view of the first embodiment with slides 115, 116 extended, over-cab mattress 138 and main bed 162 extended, dinette 178 and recliner 194 configured as beds, drop-down bed 183 set up for sleeping, and retractable worktop 190 lowered.

With left slide 115 extended, bi-fold bedroom door 156 may be closed by joining with slidable bedroom wall 154 as shown in FIGS. 1, 11 and 12. In FIGS. 1 and 11, slidable bedroom wall 154 and bi-fold bedroom door 156 are positioned at a sufficient distance from main bed 162 to allow an occupant to stand between them and main bed 162 so that main bed 162 is accessible from three sides. In FIG. 12, they are positioned closer to main bed 162 to provide more space in rear lounge 144.

Figure 17:
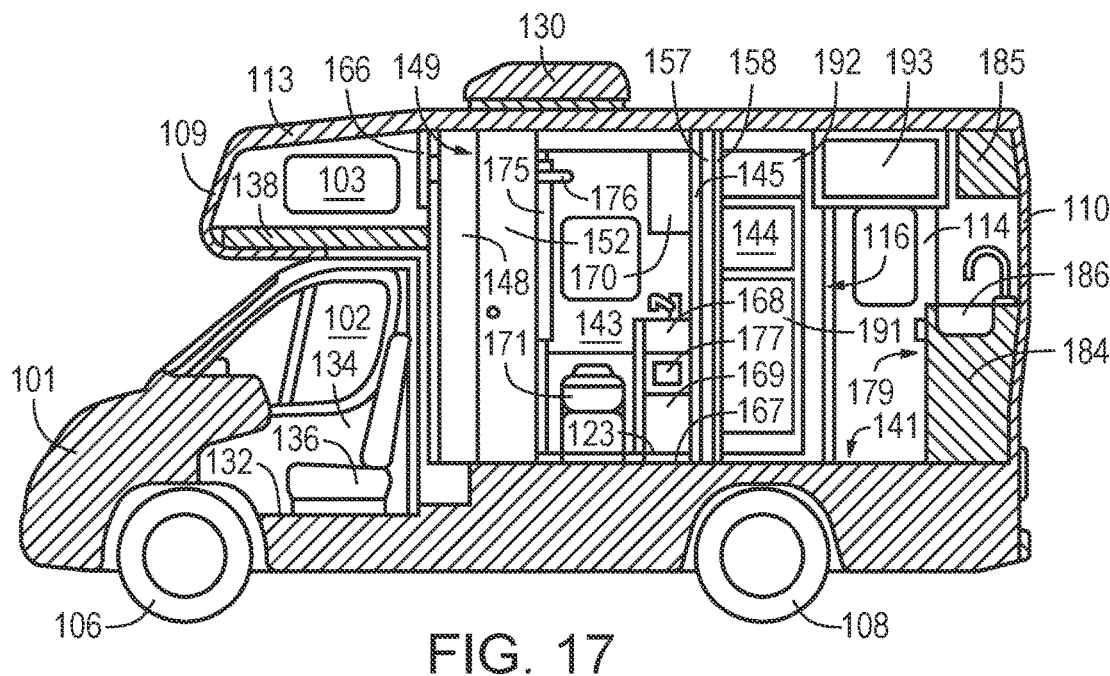
FIG. 17 is a sectional left side view of the first embodiment taken along the line 17-17 in FIG. 7 with tri-fold bathroom door 149 fully open.

Tri-fold bathroom door 149 is shown in its fully open position in FIG. 17 which is a sectional side view of the first embodiment. Third panel 152 of tri-fold bathroom door 149 can be seen adjacent to interior bathroom wall 148 outside bathroom 143 whereas first panel 150 and second panel 151 are hidden behind third panel 152. Sink 168, vanity unit 169, medicine cabinet 170, toilet 171, wardrobe door 175, tower rack 176, and tissue holder 177 can be seen inside bathroom 143.

Shower pan 172 may be installed lower than main floor 141 to give the occupants additional headroom for washing their hair. A removable floor board may be provided for covering shower pan 172 in the usual manner.

Figure 4:
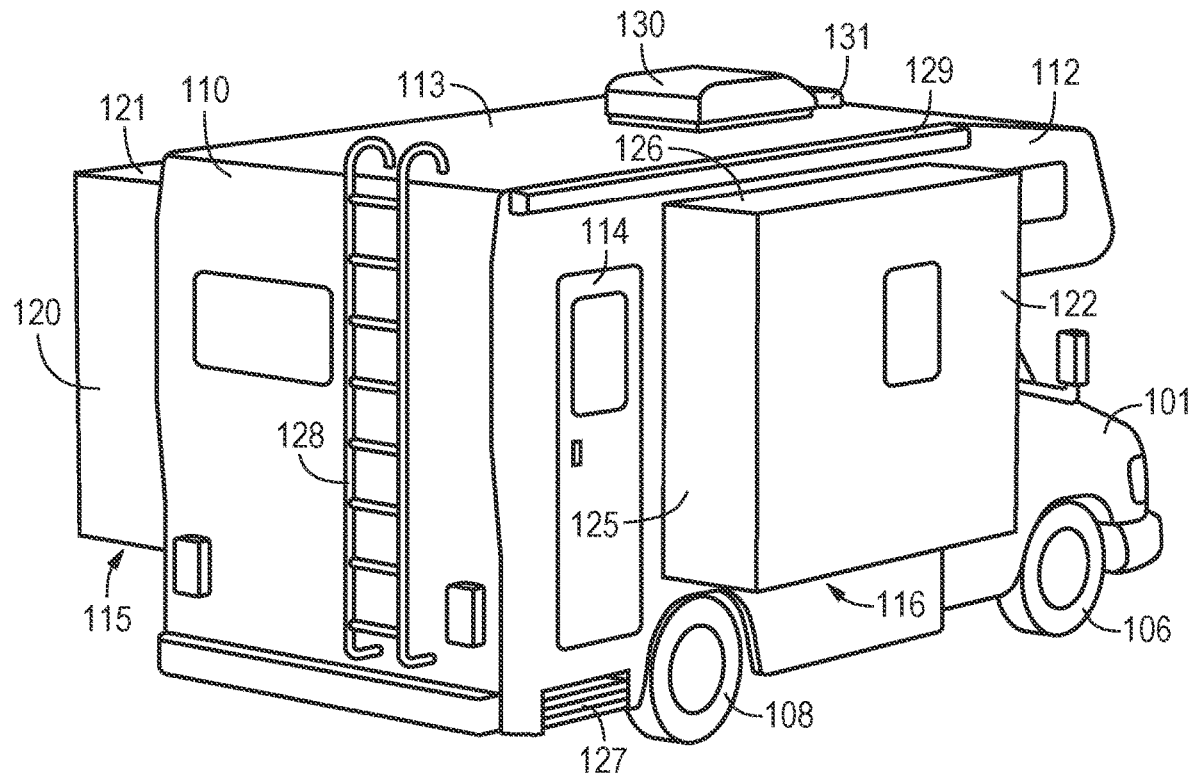
FIG. 4 is a perspective view of the exterior of the first embodiment showing the right side and the rear end with slides 115, 116 extended.
Figure 5:
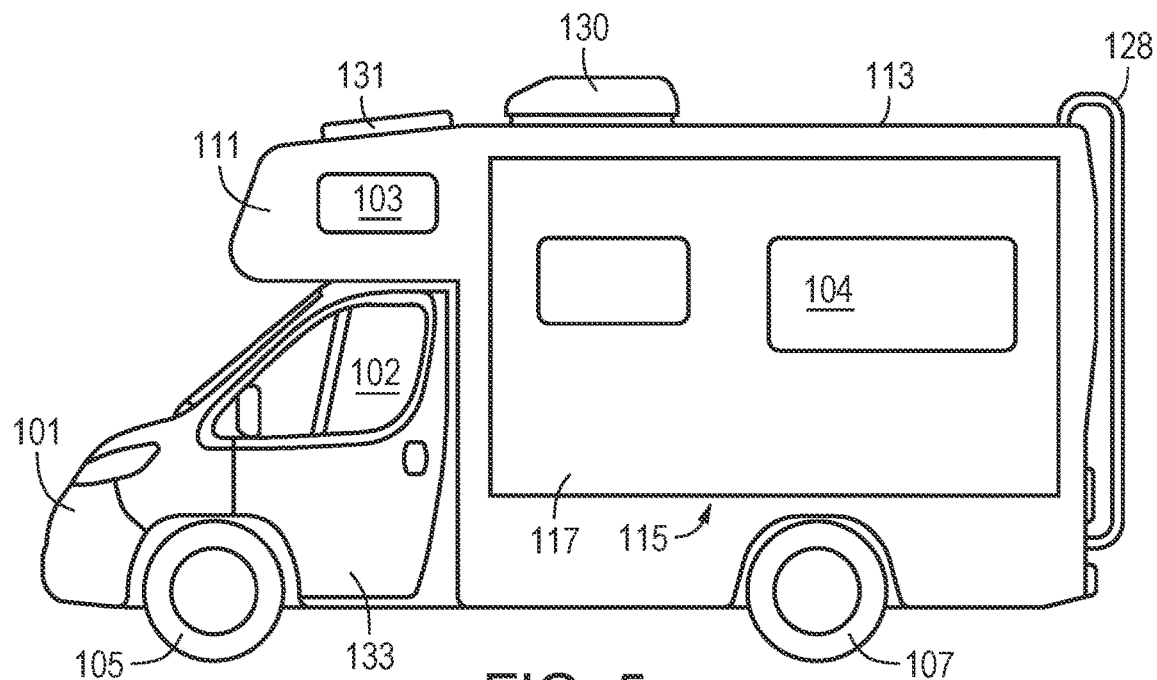
FIG. 5 is a left side view of the first embodiment.
Figure 6:
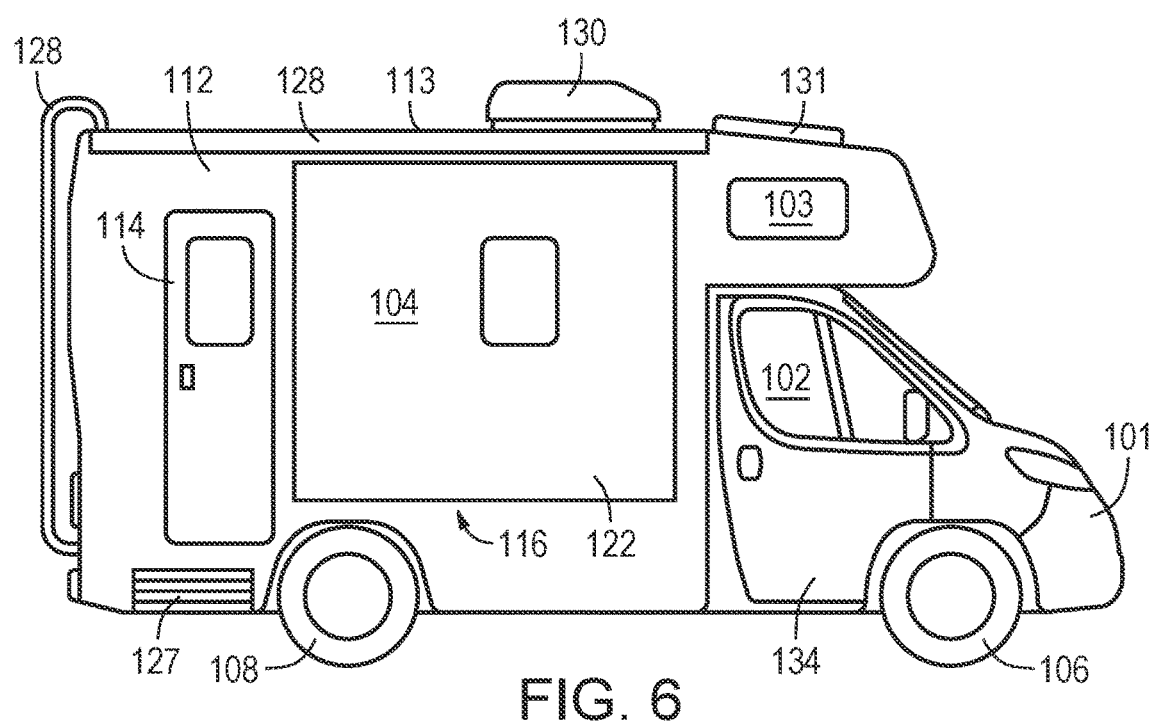
FIG. 6 is a right side view of the first embodiment.
Figure 7:
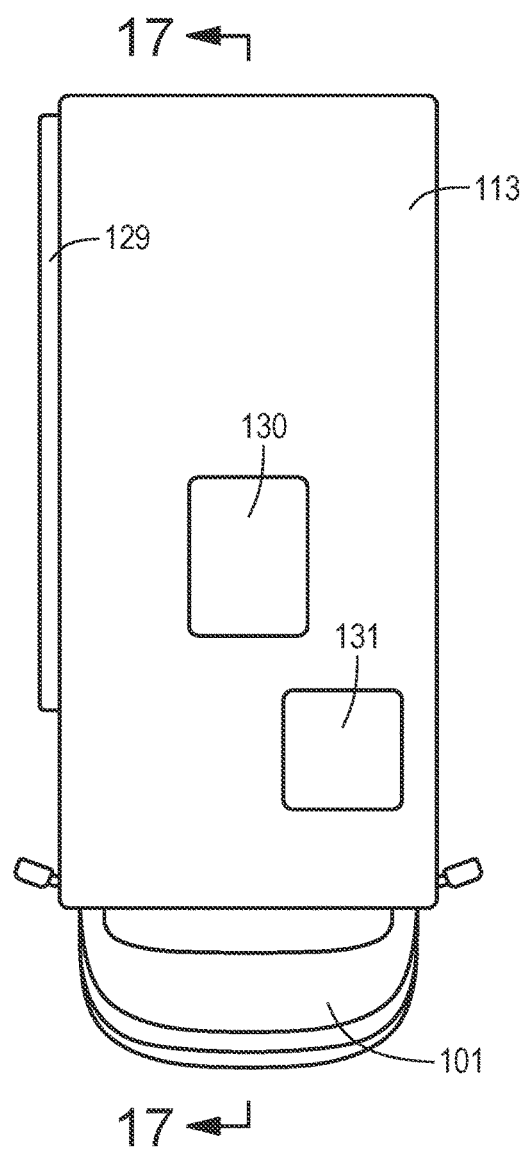
FIG. 7 is a top view of the first embodiment with slides 115, 116 retracted.
Figure 8:
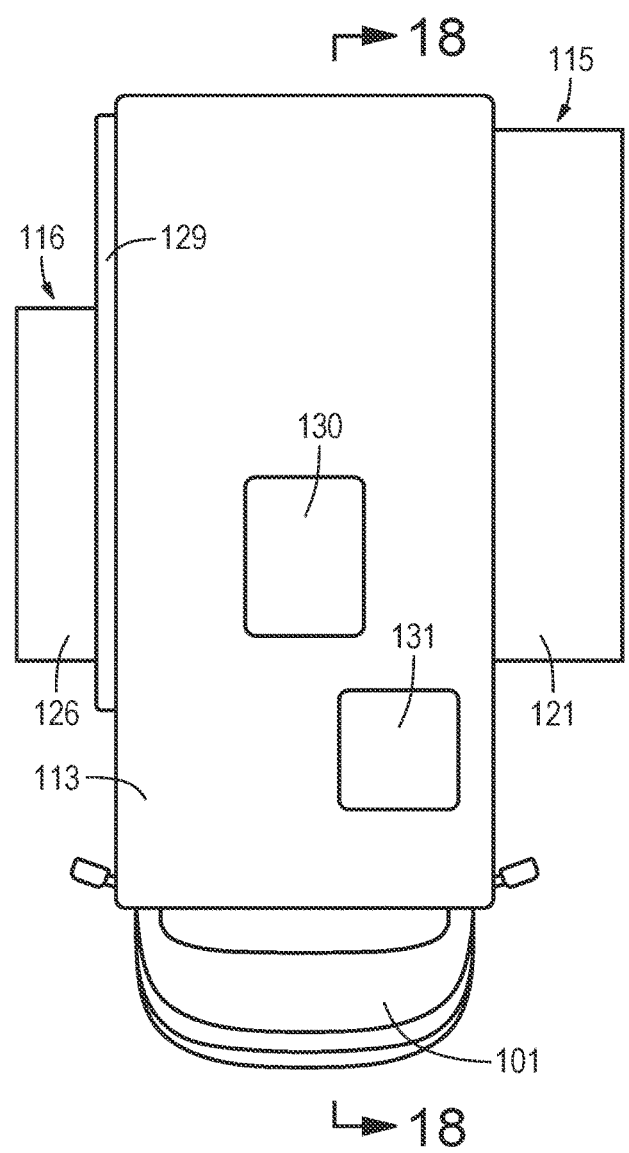
FIG. 8 is a top view of the first embodiment with slides 115, 116 extended.

If more room for storage is desired under main floor 141, shower pan 172 may be installed above main floor 141 with a shower dome mounted above an opening in roof 113. In this case, a section of floor 123 of right slide 116 under wardrobe 174 can be raised just high enough to clear shower pan 172 although outer wall 122 of right slide 116 may remain the same as shown in FIGS. 4 and 6. A pass-through compartment may be provided under main floor 141 for storage of long objects such as surfboards or skis.

Shower door 173 may be replaced by a shower curtain which may be extended forward to shield wardrobe 174 and prevent water from entering the gap between right slide 116 and forward bathroom wall 147. Other types of shield or seal may also be used to prevent water from entering this gap and to guide water into shower pan 172.

Another alternative which can save more space is to use a removable shower pan with an outlet that fits over a drain in main floor 141. As shown in FIG. 14, the removal of this type of shower pan provides additional floor space inside bathroom 143 which can be used to accommodate a foldable bathtub or a wheelchair.

Wardrobe 174 may have a second door on the side facing interior bathroom wall 148 to facilitate access to its contents when right slide 116 is in its extended position. Alternatively, a slidably movable wardrobe may be used so that it can be placed over shower pan 172 when right slide 116 is in its extended position. The movable wardrobe may be suspended from telescopic rails. An exterior wardrobe door may also be provided for accessing wardrobe 174 from the outside of the motorhome. Wardrobe 174 may be made smaller to provide a larger shower area which extends into right slide 116.

Rear lounge 144 contains a dinette 178 and a kitchen unit 179. Dinette 178 includes a forward dinette bench 180, a rear dinette bench 181, and a removable dining table 182 as shown in FIGS. 1, 2, 9, 13, 14, 15, 16 and 18. Dinette 178 may be converted into a bed as shown in FIGS. 10 and 12, or a couch as shown in FIG. 11. Dining table 182 is expandable into a larger table as shown in FIG. 13. Dinette benches 180, 181 can seat two adults each and include under-seat storage compartments in the usual manner.

An optional motorized drop-down bed 183 is installed above dinette 178. With dinette 178 set up as a bed, drop-down bed 183 and dinette 178 form a bunk bed as shown in FIGS. 10 and 12. Bed 183 can be kept in its fully raised position as shown in FIG. 1 to provide maximum headroom over dinette 178, or placed in an intermediate position as shown in FIG. 18 for use as a storage shelf while allowing the occupants to sit on dinette benches 180, 181. With bed 183 installed, the motorhome has a sleeping capacity of four with slides 115, 116 retracted and seven with slides 115, 116 extended.

Kitchen unit 179 includes a lower kitchen cabinet 184, an upper kitchen cabinet 185, a kitchen sink 186, a stove 187, an oven 188, and a fixed worktop 189. A retractable worktop 190 is hinged to rear end wall 110. Retractable worktop 190 is shown in its raised position in FIGS. 1, 14 and 15, and shown in its lowered position in FIGS. 9, 10, 11, 12, 13 and 16. With worktop 190 lowered and slides 115, 116 retracted, food preparation can still be done using dining table 182.

A refrigerator 191 is provided at the rear end of right slide 116 with a cupboard 192 above it. A lounge television 193 is mounted to rear wall 125 of right slide 116 and can be positioned in front of cupboard 192 or adjacent to main entry door 114.

Rear lounge 144 also contains a foldable recliner 194 which may be extended into a single bed as shown in FIG. 12 or joined with rear dinette bench 181 to form a long couch as shown in FIG. 13. An under-floor recliner storage compartment 195 is provided for storage of recliner 194 as shown in FIGS. 1 and 18. Recliner storage compartment 195 has a hinged cover 196 which is shown in a partially open position in FIG. 1. Recliner 194 may be freestanding or mechanically connected to main floor 141 and motorized with the use of one or more electric motors. Recliner storage compartment 195 may be accessible from the outside of the motorhome and may be used for other purposes if recliner 194 is stored somewhere else or not installed.

Folding chairs 197, 198 are provided for additional seating as shown in FIG. 13. A waste bin 199 is also provided in rear lounge 144. Table 137 may be placed in rear lounge 144 as shown in FIG. 11 or in bedroom 142 as shown in FIG. 13.

With slidable bedroom wall 154 stored inside left-slide partition 153 and bi-fold bedroom door 156 stored adjacent to slidable bathroom door 160, bedroom 142 and rear lounge 144 are combined to create a large open space as shown in FIG. 13.

The configuration shown in FIG. 15 with left slide 115 extended and right slide 116 retracted allows awning 129 to be used with a large open space for sitting underneath. The configuration shown in FIG. 16 with left slide 115 retracted and right slide 116 extended allows the use of shower pan 172 while keeping the width of the motorhome under 3 m (10 feet).

The positions of bedroom 142 and bathroom 143 may be reversed so that the bathroom is positioned forward of dinette 178 but it is preferable to have bathroom 143 and refrigerator 191 on the same side with more open space on the other side.

Description of Second Embodiment

Figure 19:
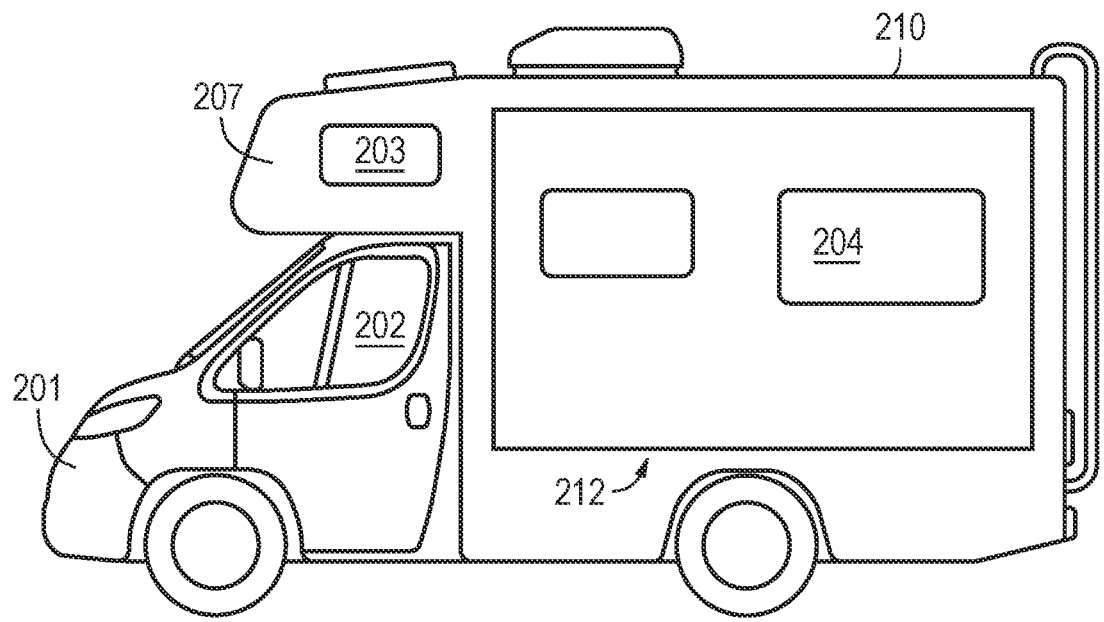
FIG. 19 is a left side view of the second embodiment.
Figure 20:
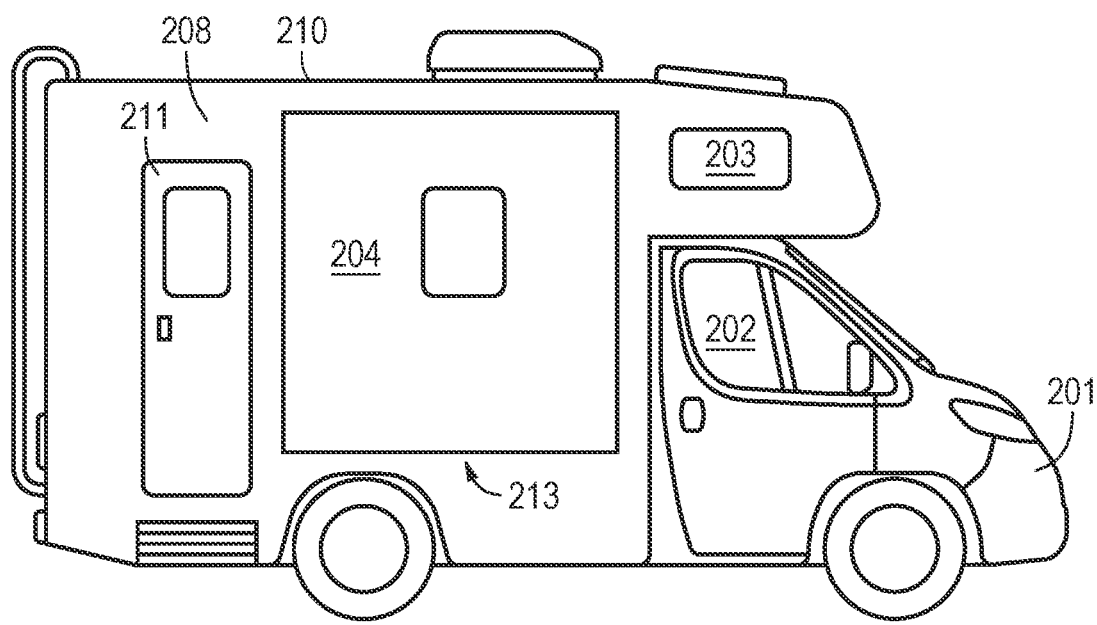
FIG. 20 is a right side view of the second embodiment.

FIGS. 19-26 show the second embodiment which is a motorhome of approximately 5.8 m (19 feet) in length without a roof-access ladder. This embodiment is shorter than the first embodiment and also has a shorter wheelbase as can be seen in FIGS. 19 and 20.

The motorhome of the second embodiment includes a front end 201, a cab section 202, an over-cab section 203, and a main section 204.

The body of the motorhome includes a front wall 205, a rear end wall 206, a fixed left side wall 207, a fixed right side wall 208, a main floor 209, a roof 210, a main entry door 211, a left slide 212, and a right slide 213. Main section 204 contains a bedroom 214, a bathroom 215, and a rear lounge 216.

Figure 24:
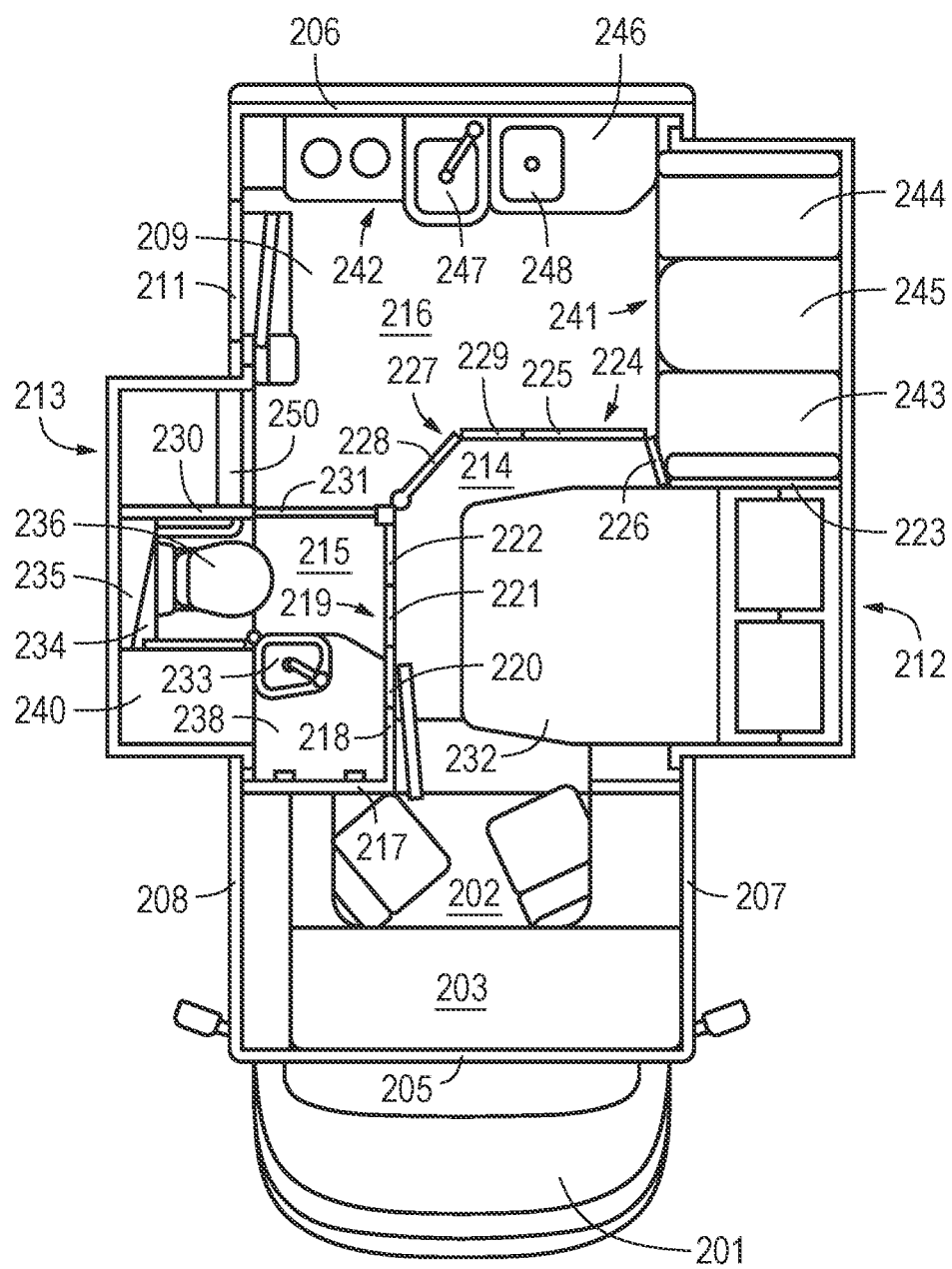
FIG. 24 is a plan view of the second embodiment with slides 212, 213 extended, main bed 232 extended, bathroom sink 233 positioned outside the interior of right slide 213, dinette 241 configured for dining, and drop leaf 246 raised for cooking with removable kitchen sink 248 installed.
Figure 25:
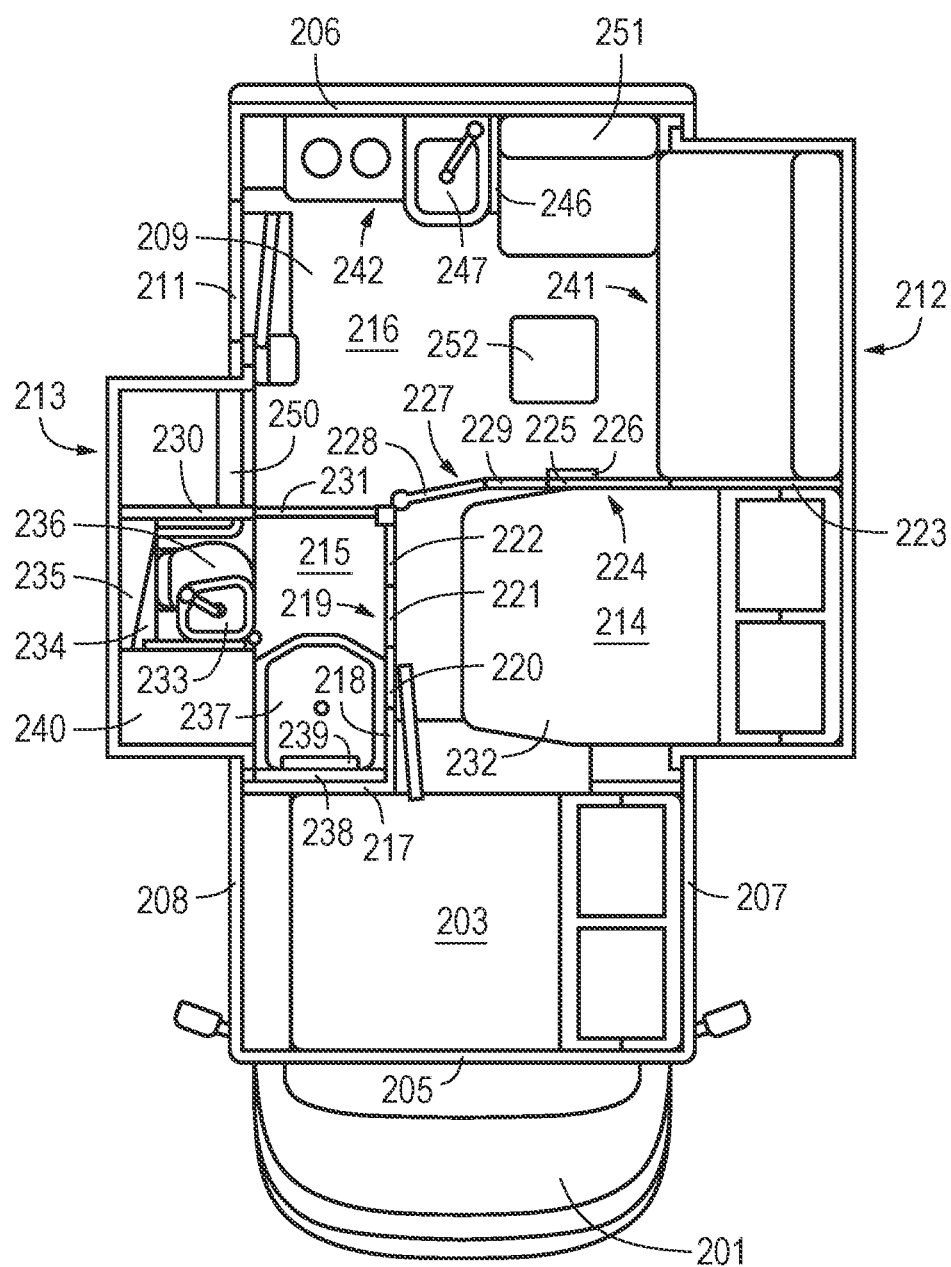
FIG. 25 is a plan view of the second embodiment with slides 212, 213 extended, main bed 232 extended, bathroom sink 233 positioned over toilet 236, dinette 241 joined with recliner 251 to form an L-shape seating arrangement, and drop leaf 246 lowered.
Figure 26:
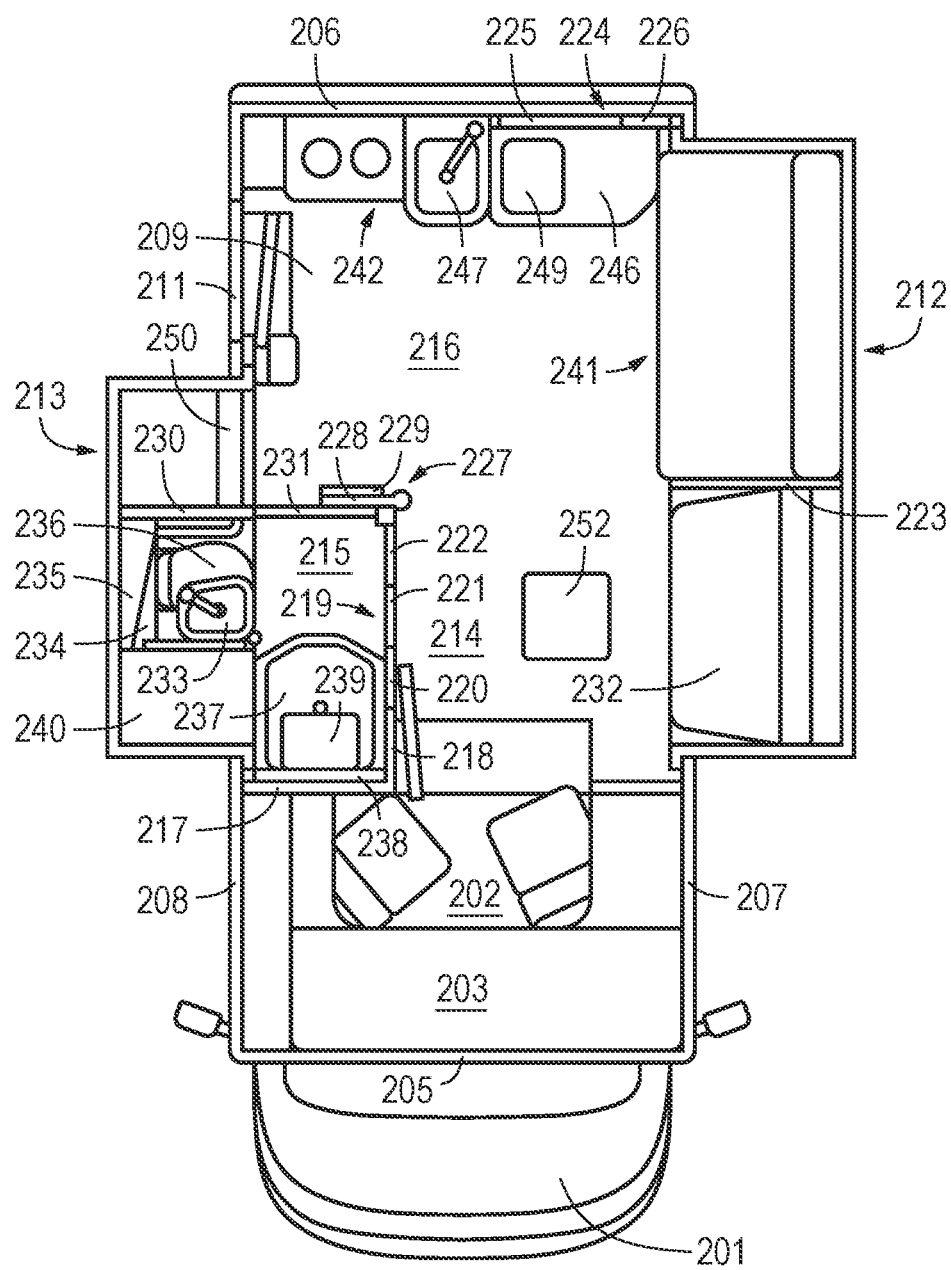
FIG. 26 is a plan view of the second embodiment with slides 212, 213 extended, main bed 232 and dinette 241 configured as couches, bathroom sink 233 positioned over toilet 236, and drop leaf 246 raised for cooking with sink cover 249 installed.

Bathroom 215 is separated from cab section 202, over-cab section 203, and the exterior of the motorhome by a forward bathroom wall 217. As shown in FIGS. 24, 25 and 26, bedroom 214 and bathroom 215 can be separated by an interior bathroom wall 218 and a tri-fold bathroom door 219 which includes a first panel 220, a second panel 221, and a third panel 222.

As shown in FIGS. 24 and 25, bedroom 214 and rear lounge 216 can be separated by a left-slide partition 223, a movable bedroom wall 224 which includes a first panel 225 and a second panel 226, and a bi-fold bedroom door 227 which includes a first panel 228 and a second panel 229. Panels 225 and 226 are connected to each other by a 180-degree hinge.

Left-slide partition 223 is retractable downwards so that it can be kept substantially out of sight when not in use. Movable bedroom wall 224 has wheels and can be moved to the rear end of the motorhome for storage as shown in FIGS. 21, 22, 23 and 26.

Another alternative is to use a foldable bedroom wall with its top half hinged to its bottom half so that it can be folded downwards and slid inside the left-slide partition for storage. It is also possible for each half to have two side-by-side panels connected by a vertical hinge so that the wall can be folded either downwards or sideways.

As shown in FIGS. 24, 25 and 26, bathroom 215 and rear lounge 216 can be separated by a right-slide partition 230 and a slidable bathroom door 231.

Figure 21:
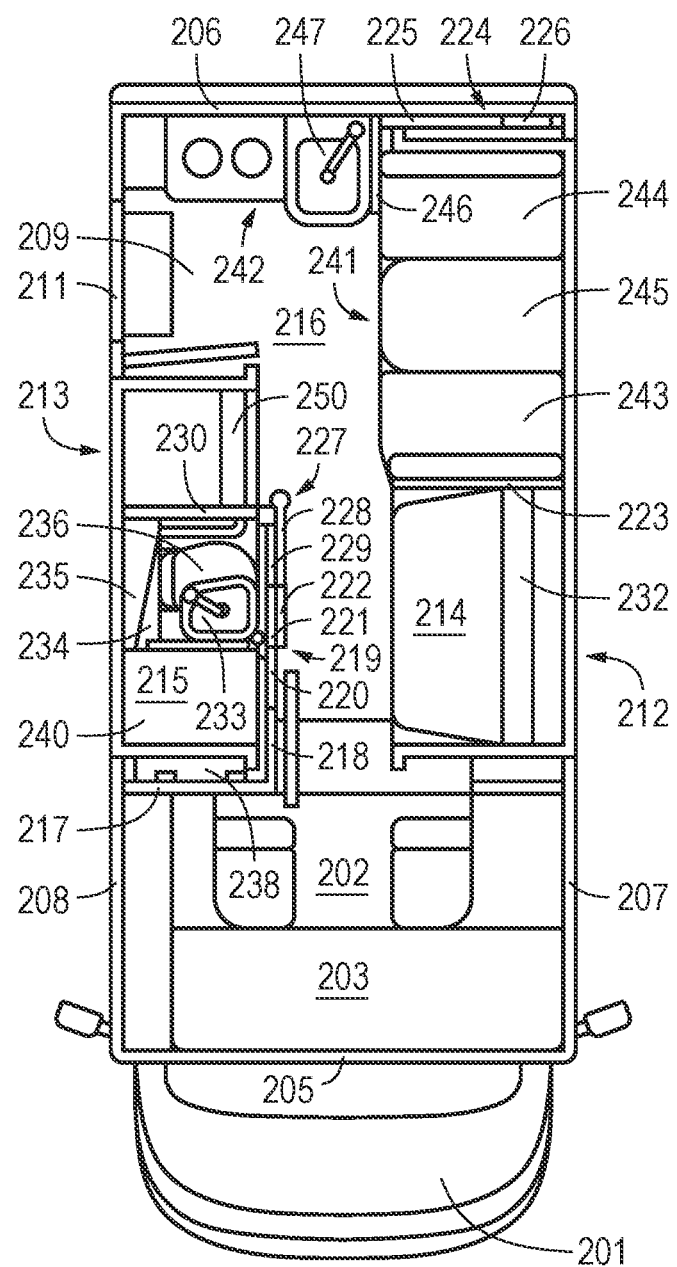
FIG. 21 is a plan view of the second embodiment with slides 212, 213 retracted, main bed 232 configured as a couch, bathroom 215 fully retracted, bathroom sink 233 positioned over toilet 236, dinette 241 configured for dining, and drop leaf 246 lowered.
Figure 22:
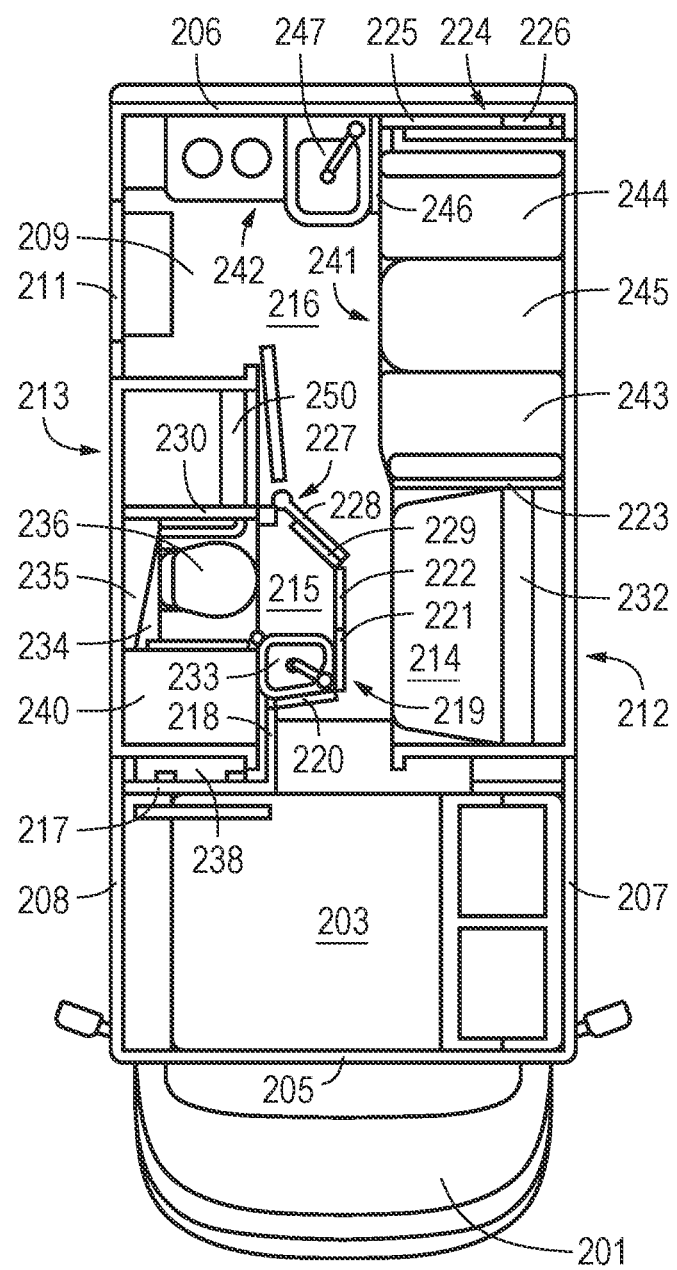
FIG. 22 is a plan view of the second embodiment with slides 212, 213 retracted, main bed 232 configured as a couch, bathroom 215 partially extended inwards, bathroom sink 233 positioned outside the interior of right slide 213, dinette 241 configured for dining, and drop leaf 246 lowered.
Figure 23:
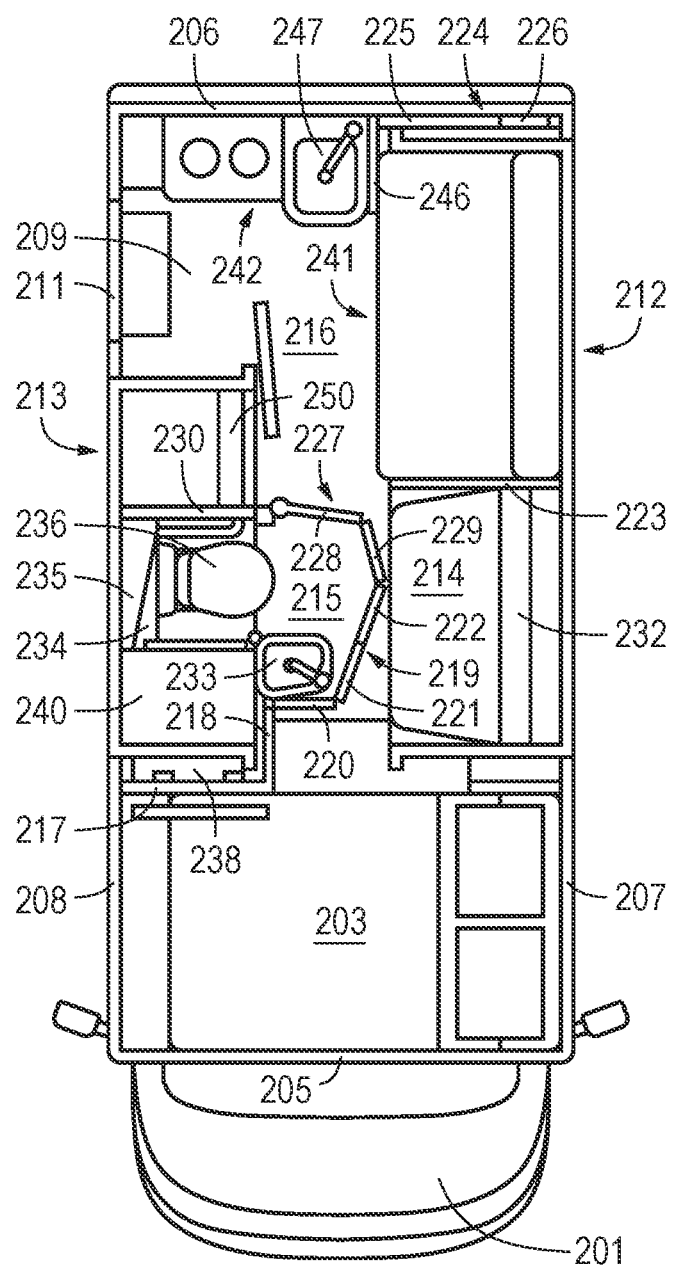
FIG. 23 is a plan view of the second embodiment with slides 212, 213 retracted, main bed 232 and dinette 241 configured as couches, bathroom 215 fully extended inwards, bathroom sink 233 positioned outside the interior of right slide 213, and drop leaf 246 lowered.

Bedroom 214 contains a main bed 232 which may be slightly smaller than main bed 162 of the first embodiment. Bathroom 215 contains a pivotable bathroom sink 233, a shelf 234, a medicine cabinet 235, a retractable toilet 236, and a shower pan 237. Sink 233 is pivotable between a first position above toilet 236 as shown in FIGS. 21, 25 and 26, and a second position just outside the interior of right slide 213 as shown in FIGS. 22, 23 and 24. FIG. 21 shows that this arrangement makes it possible for bathroom 215 to take up even less space in its fully retracted configuration than bathroom 143 of the first embodiment.

A hinged floor board 238 is provided for covering shower pan 237. With right slide 213 extended, floor board 238 can be moved between a lowered position shown in FIG. 24 and a raised position shown in FIGS. 25 and 26. A locking mechanism may be used for securing floor board 238 in its raised position. A folding shower seat 239 is attached to floor board 238 and can be moved between a retracted position shown in FIG. 25 and an extended position shown in FIG. 26 when floor board 238 is in its raised position. This arrangement utilizes the space inside shower pan 237 as another under-floor seat storage compartment so that this space is not wasted when the motorhome is in its fully retracted configuration. Shower pan 237, floor board 238 and shower seat 239 may be removable together for cleaning and maintenance.

A wardrobe 240 is provided at the forward end of right slide 213. A tissue holder may be attached to the underside of sink 233. A shower curtain may be attached to the underside of roof 210 and may be extendable to shield wardrobe 240 as well as forward bathroom wall 217 and raised floor board 238. Cutout openings may be provided in the shower curtain for access to shower fixtures and folding shower seat 239.

With right slide 213 extended, floor board 238 may be kept in its lowered position to provide a large floor space inside bathroom 215 for use as a make-up area or a dressing area. A mirror, a retractable shelf and storage compartments may be provided on the outside of wardrobe 240. Alternatively, wardrobe 240 may have a second door on the side facing interior bathroom wall 218 with a mirror attached to the inside of this door. A foldable bathtub may be used inside bathroom 215 if an opening is provided in floor board 238 for a drain hose to be inserted for draining water into shower pan 237.

Rear lounge 216 contains a dinette 241 and a kitchen unit 242. As shown in FIGS. 21, 22 and 24, dinette 241 includes a forward dinette bench 243, a rear dinette bench 244, and a dining table 245 which are smaller than dinette benches 180, 181 and dining table 182 of the first embodiment in the respective order. Dinette 241 may be set up as a couch as shown in FIGS. 23, 25 and 26, or converted into a bed for a child or a small adult.

A retractable worktop in the form of a drop leaf 246 is hinged to kitchen unit 242 and can be raised for use with left slide 212 in its extended position. Kitchen unit 242 is similar to kitchen unit 179 of the first embodiment and includes a fixed kitchen sink 247. Drop leaf 246 has an opening through which a removable kitchen sink 248 can be temporarily installed as shown in FIG. 24. A drain hose is provided for connecting removable kitchen sink 248 to a drain pipe under fixed kitchen sink 247. A sink cover 249 is also provided as shown in FIG. 26. Removable kitchen sink 248 may be stored inside fixed kitchen sink 247 when drop leaf 246 is in its lowered position.

Drop leaf 246 is slidably movable so that it can be moved by a small distance away from rear end wall 206 and raised for use with movable bedroom wall 224 stored at the rear end of the motorhome as shown in FIG. 26.

A refrigerator 250 is provided at the rear end of right slide 213. Rear lounge 216 also contains a recliner 251 which can be extended into a single bed or folded and stored in an under-floor storage compartment in the same way as recliner 194 of the first embodiment. A removable table 252 is provided as shown in rear lounge 216 in FIG. 25 and shown in bedroom 214 in FIG. 26.
With left-slide partition 223 retracted downwards and movable bedroom wall 224 stored at the rear end of the motorhome, bedroom 214 and rear lounge 216 are combined to create a large open space as shown in FIGS. 21 and 26.

Description of Third Embodiment

FIGS. 27-42 show the third embodiment which is a motorhome of approximately 6.1 m (20 feet) in length, 2.3 m (7.6 feet) in width and 3.3 m (10.7 feet) in overall height in its fully retracted configuration without an awning.

This embodiment includes a front end 301, a cab section 302, an over-cab section 303, and a main section 304 which are similar to front end 101, cab section 102, over-cab section 103, and main section 104 of the first embodiment in the respective order.
The body of the motorhome includes a front wall 305, a rear end wall 306, a fixed left side wall 307, a fixed right side wall 308, a deck 309, a main entry door 310, a left slide 311, and a right slide 312.

Figure 40:
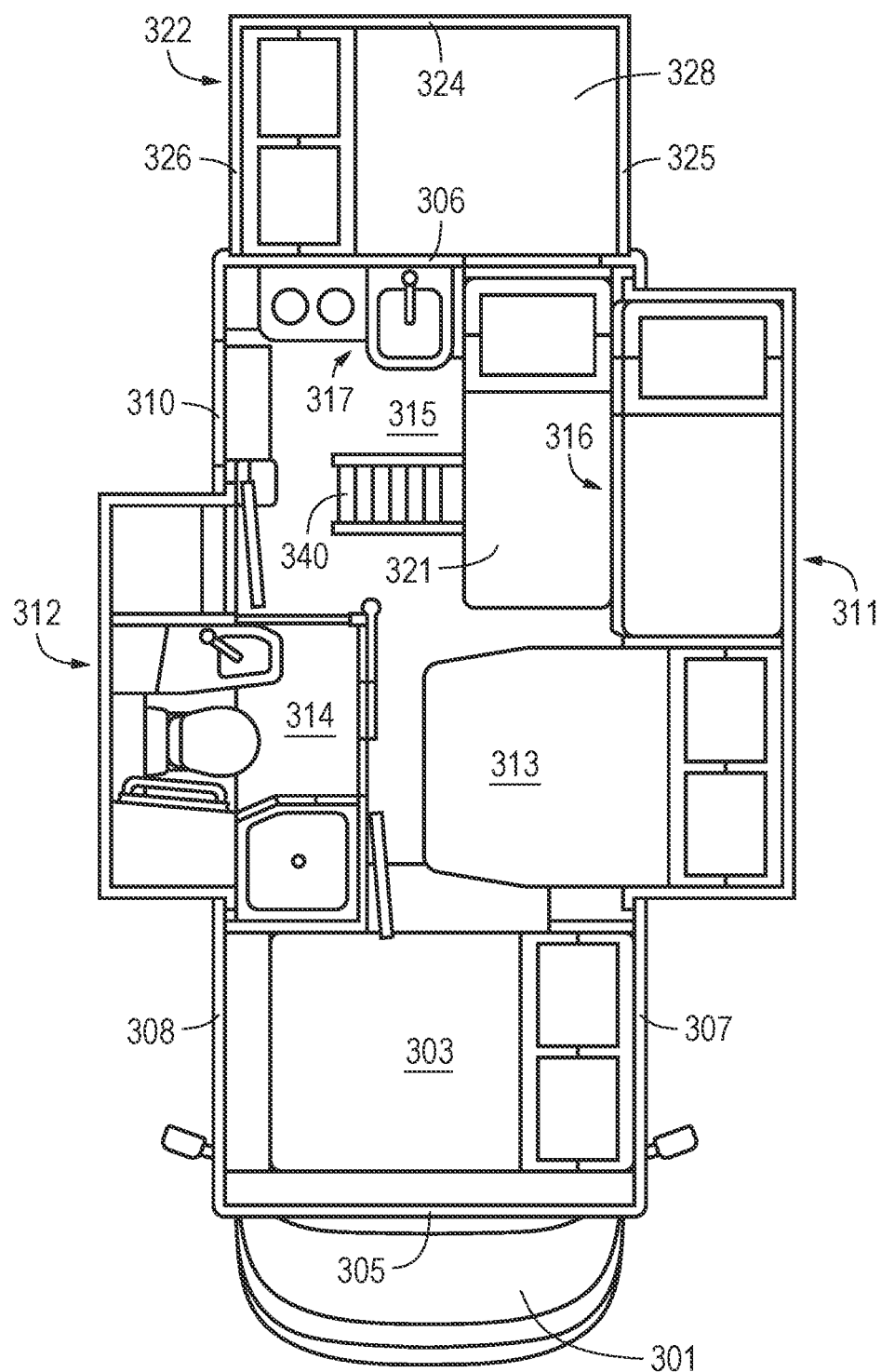
FIG. 40 is a plan view of the interior of the third embodiment with slides 311, 312 and retractable rear enclosure 322 extended, with dinette 316 and recliner 321 set up as beds, and deck-access ladder 340 in a tilted position adjacent to recliner 321.
Figure 42:
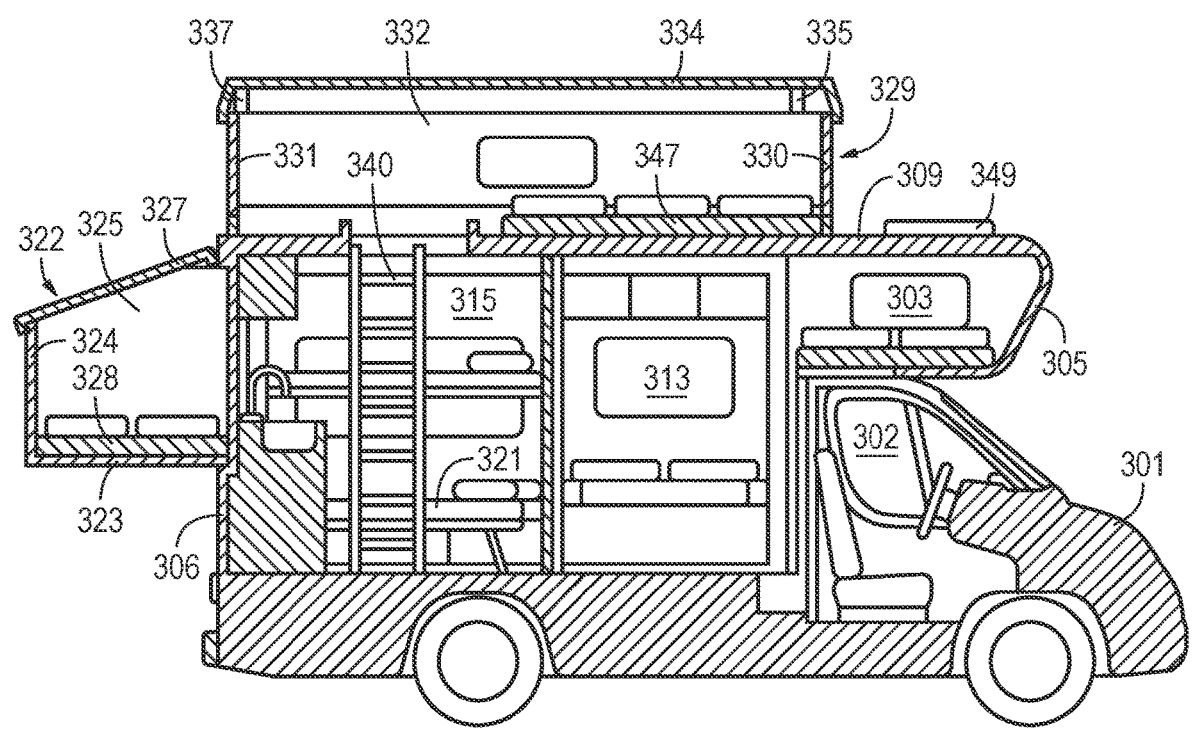
FIG. 42 is a sectional right side view of the third embodiment taken along the line 42-42 in FIG. 35 with retractable rear enclosure 322 extended and retractable deck cover 334 in an intermediate position, with king-size mattress 347 set up for sleeping.
Figure 43:
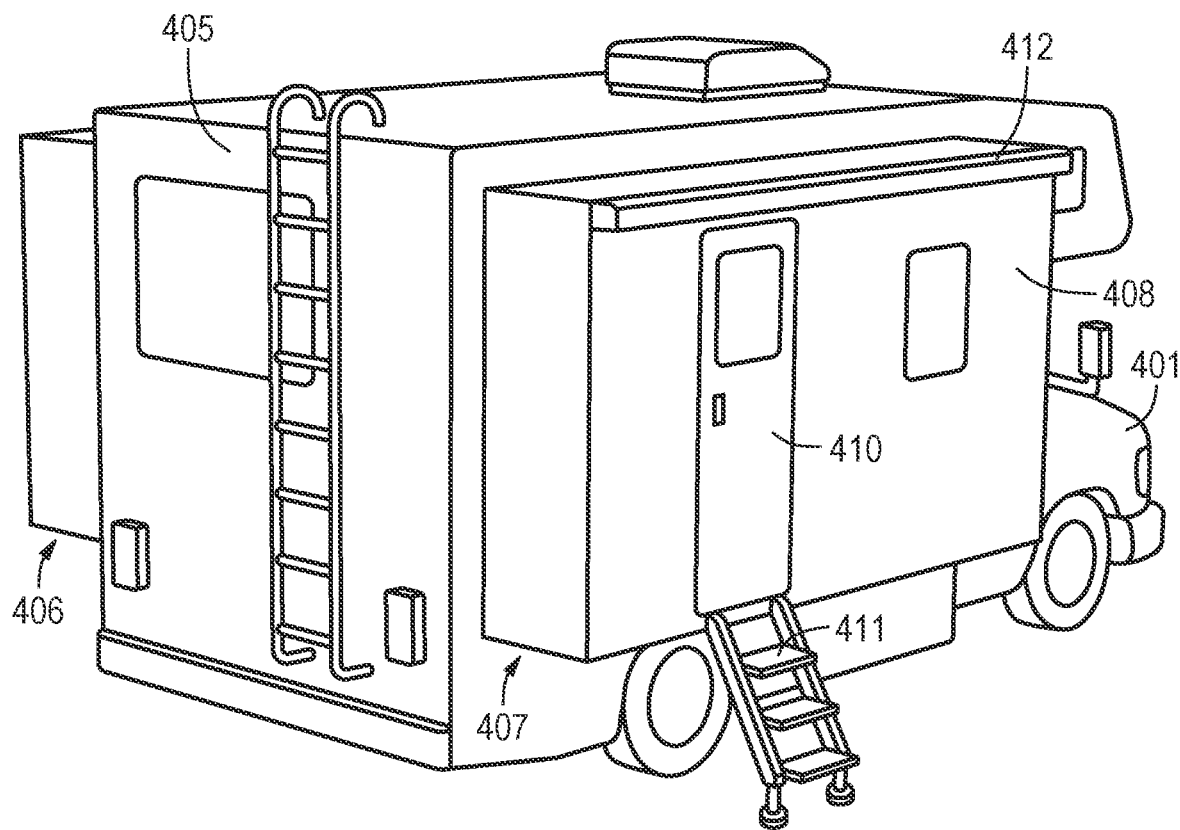
FIG. 43 is a perspective view of the fourth embodiment with slides 406, 407 extended and retractable steps 411 lowered for use.

Main section 304 contains a bedroom 313, a bathroom 314, and a rear lounge 315. Rear lounge 315 contains a dinette 316 and a kitchen unit 317. Dinette 316 includes a forward dinette bench 318, a rear dinette bench 319, and a dining table 320. A foldable recliner 321 is also provided and may be stored in an under-floor storage compartment or extended into a bed as shown in FIGS. 40 and 42.

A retractable rear enclosure 322 is attached to rear end wall 306 and includes a base 323, an end wall 324, a left side wall 325, a right side wall 326, and a roof 327. A rear mattress 328 is placed on base 323 of rear enclosure 322 and may be removed when not in use. An opening in rear end wall 306 provides access to rear enclosure 322 from rear lounge 315. Left slide 311 may have a rear window to allow access to rear enclosure 322 when the motorhome is in its retracted configuration. A curtain or a sliding door may be used for separating rear enclosure 322 from rear lounge 315. Rear enclosure 322 is shown in its retracted position in FIGS. 29, 30, 32, 34, 39 and 41, and shown in its extended position in FIGS. 27, 28, 31, 33, 35, 36, 37, 38, 40 and 42.

A deck enclosure 329 is provided over deck 309 and includes four hinged panels 330, 331, 332, 333, and a retractable deck cover 334 which is supported by four retractable posts 335, 336, 337, 338. A deck hatch 339 and a deck-access ladder 340 are provided for accessing deck 309 from rear lounge 315.

Deck furniture includes a folding table 341, folding chairs 342, 343, 344, 345, 346, and a king-size folding mattress 347. An air conditioner 348 and a forward hatch 349 are provided at the forward end of deck 309.

Figure 27:
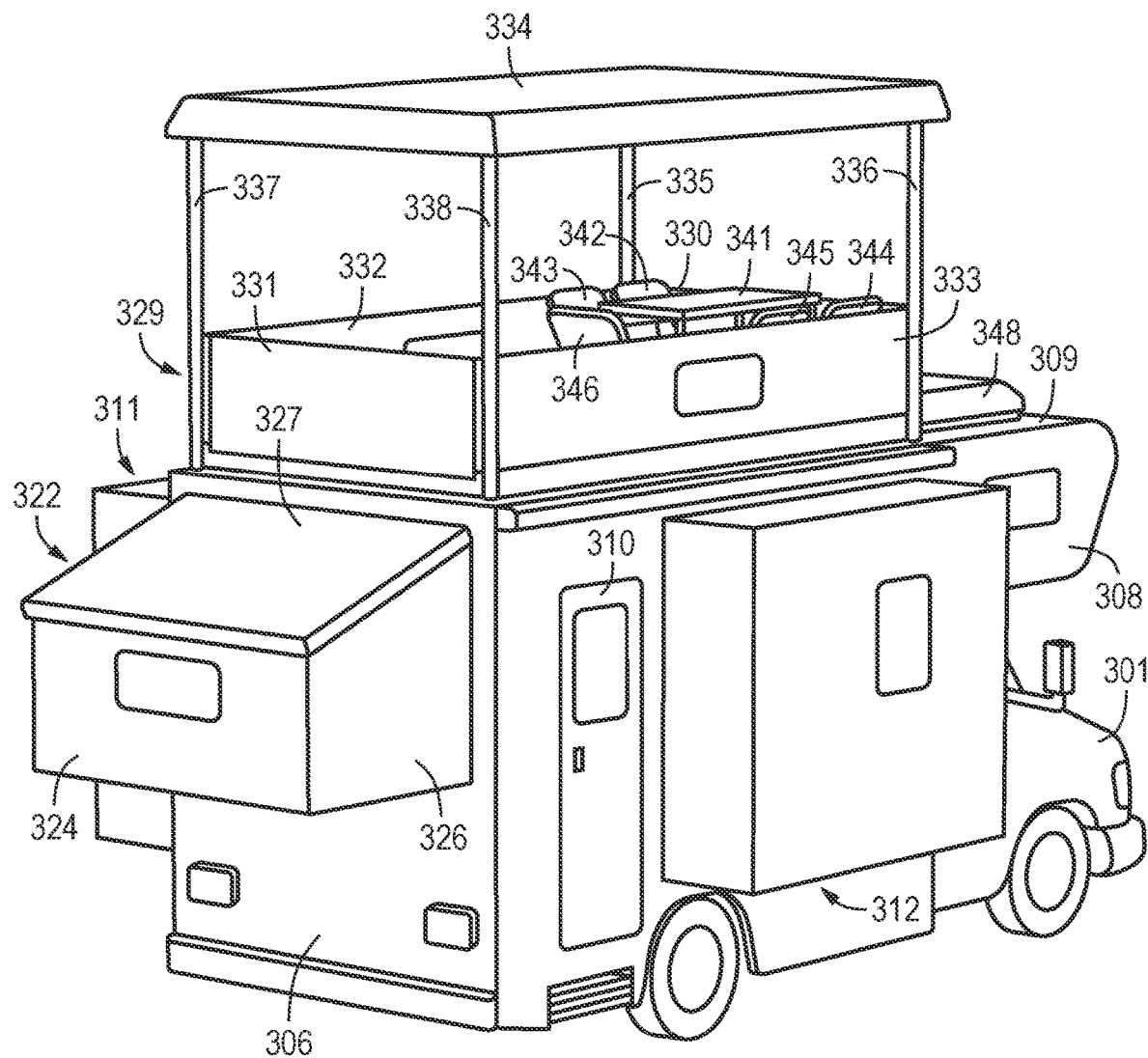
FIG. 27 is a perspective view of the third embodiment with slides 311, 312 and retractable rear enclosure 322 extended, and retractable deck cover 334 in its highest position with table 341 and chairs 342, 343, 344, 345, 346 set up for use.
Figure 31:
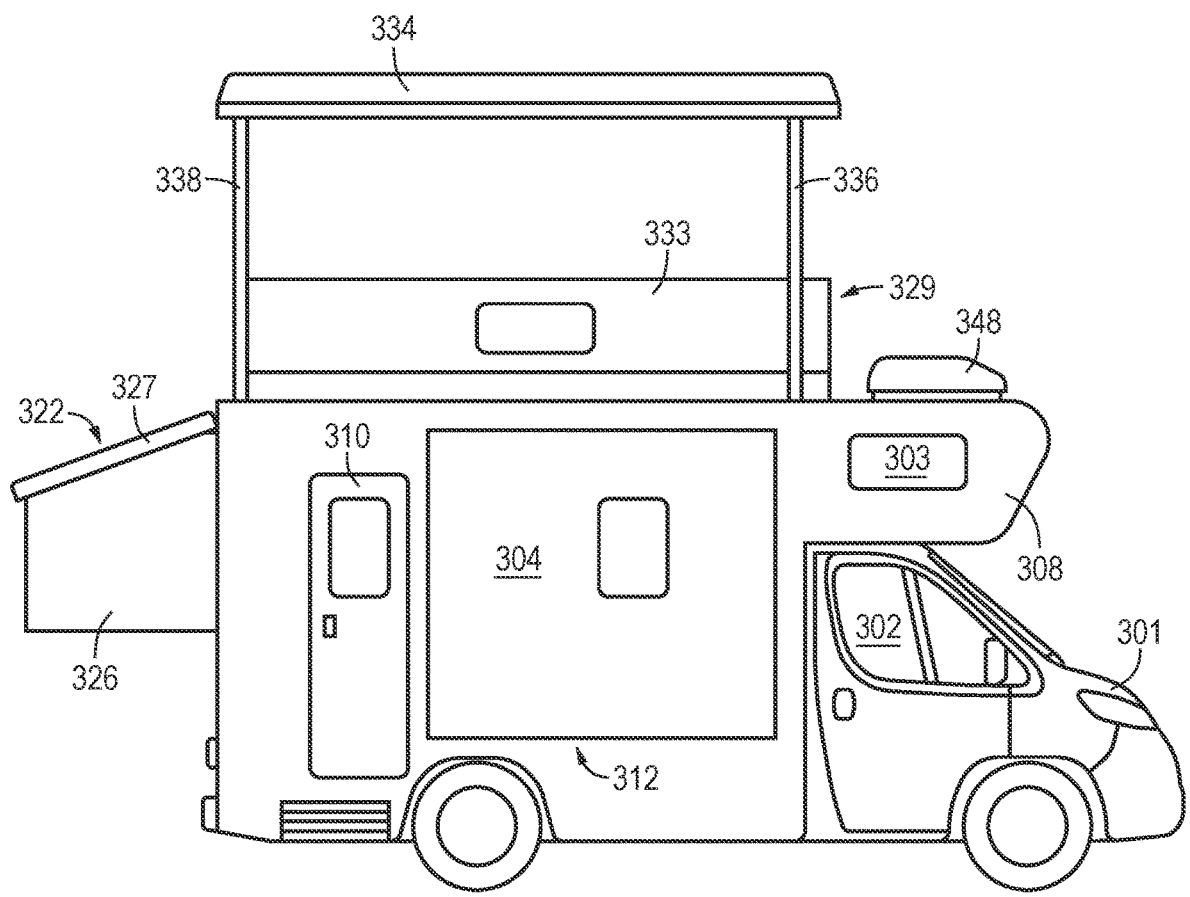
FIG. 31 is a right side view of the third embodiment with retractable rear enclosure 322 extended, and retractable deck cover 334 in its highest position.
Figure 32:
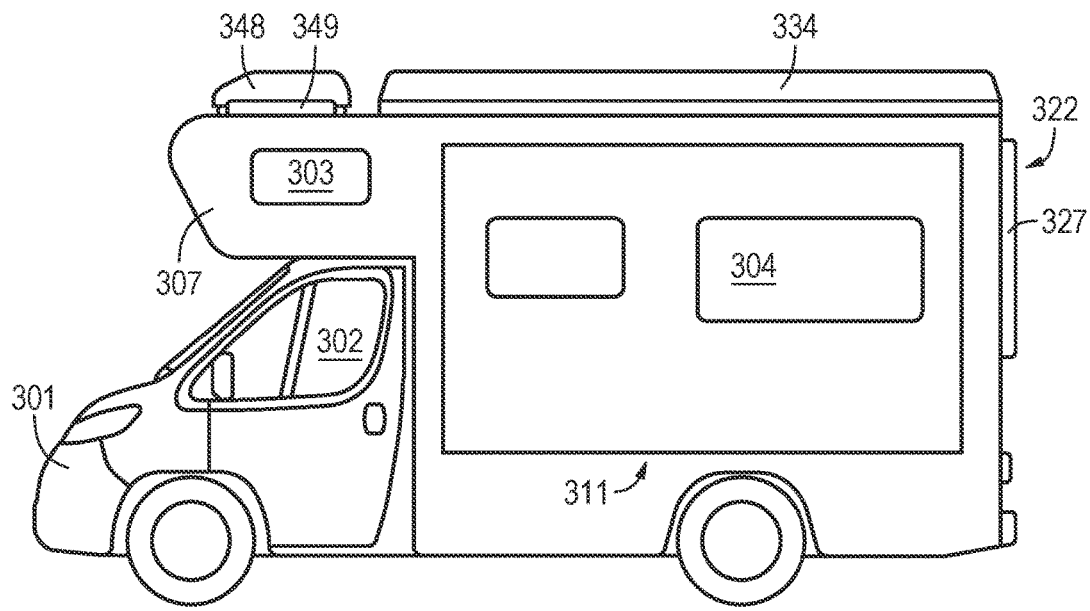
FIG. 32 is a left side view of the third embodiment with retractable rear enclosure 322 retracted, and retractable deck cover 334 in its lowest position.
Figure 37:
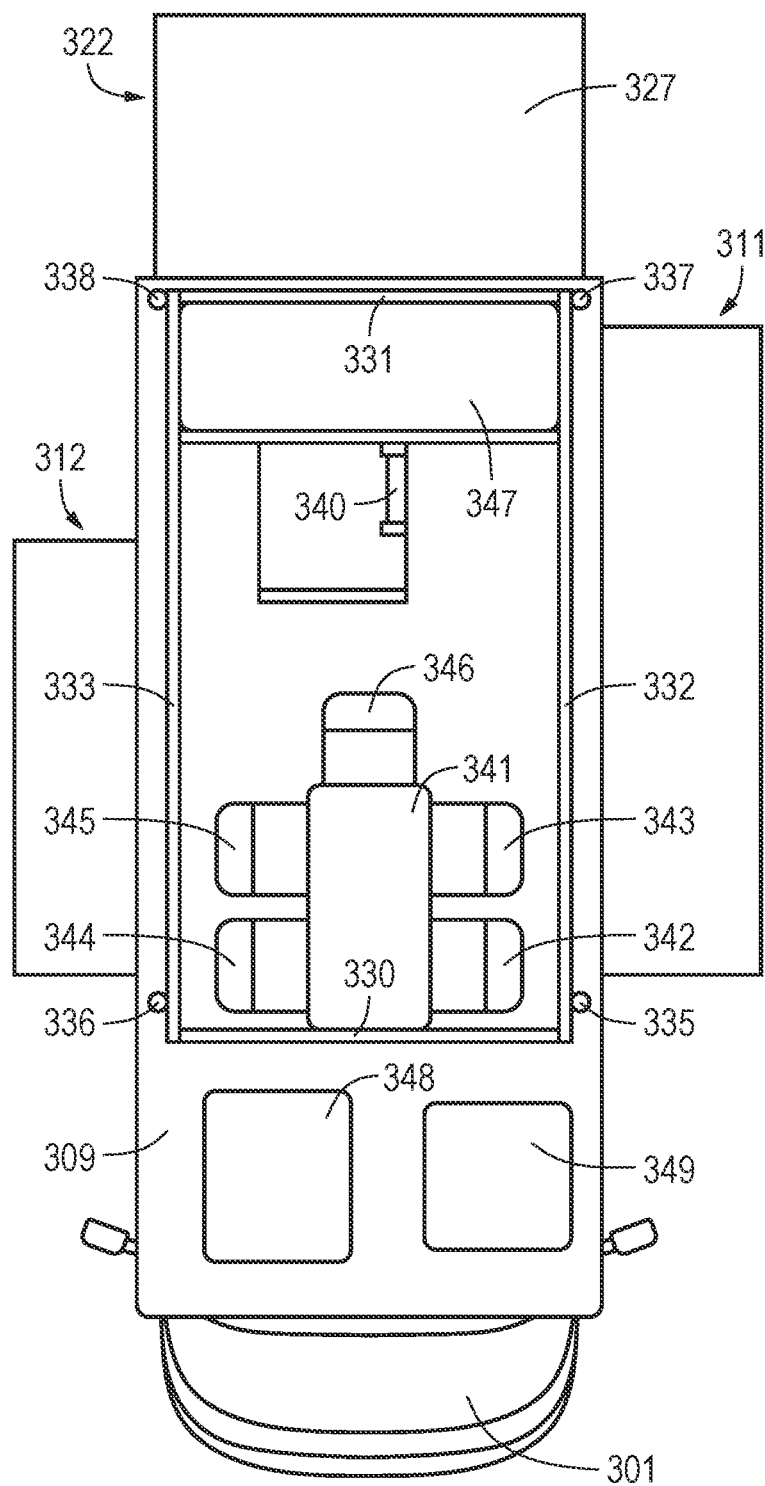
FIG. 37 is a plan view of the deck of the third embodiment with slides 311, 312 and retractable rear enclosure 322 extended, and hinged panels 330, 331, 332, 333 in their raised positions, with table 341 and chairs 342, 343, 344, 345, 346 set up for use.
Figure 41:
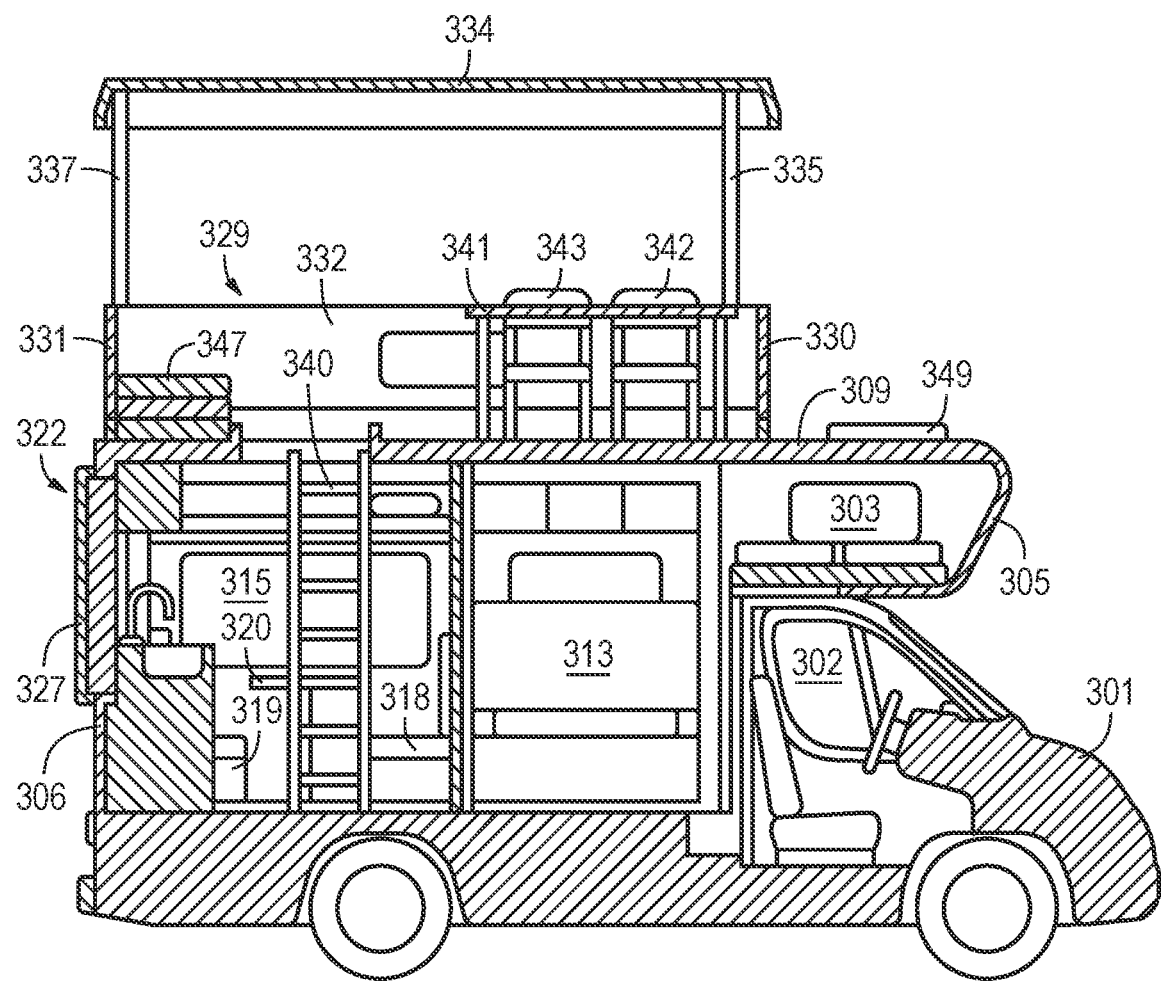
FIG. 41 is a sectional right side view of the third embodiment taken along the line 41-41 in FIG. 34 with retractable rear enclosure 322 retracted and retractable deck cover 334 in its highest position, with table 341 and chairs 342, 343, 344, 345 set up for use.

The motor home of the third embodiment is shown with retractable deck cover 334 in its highest position in FIGS. 27, 31 and 41. Mattress 347 can be stored at the rear end of deck 309 while folding table 341 and folding chairs 342, 343, 344, 345, 346 are in use as shown in FIGS. 37 and 41. This configuration is suitable for having a meal or a meeting as well as for watching the scenery or an outdoor spectator event.

Figure 28:
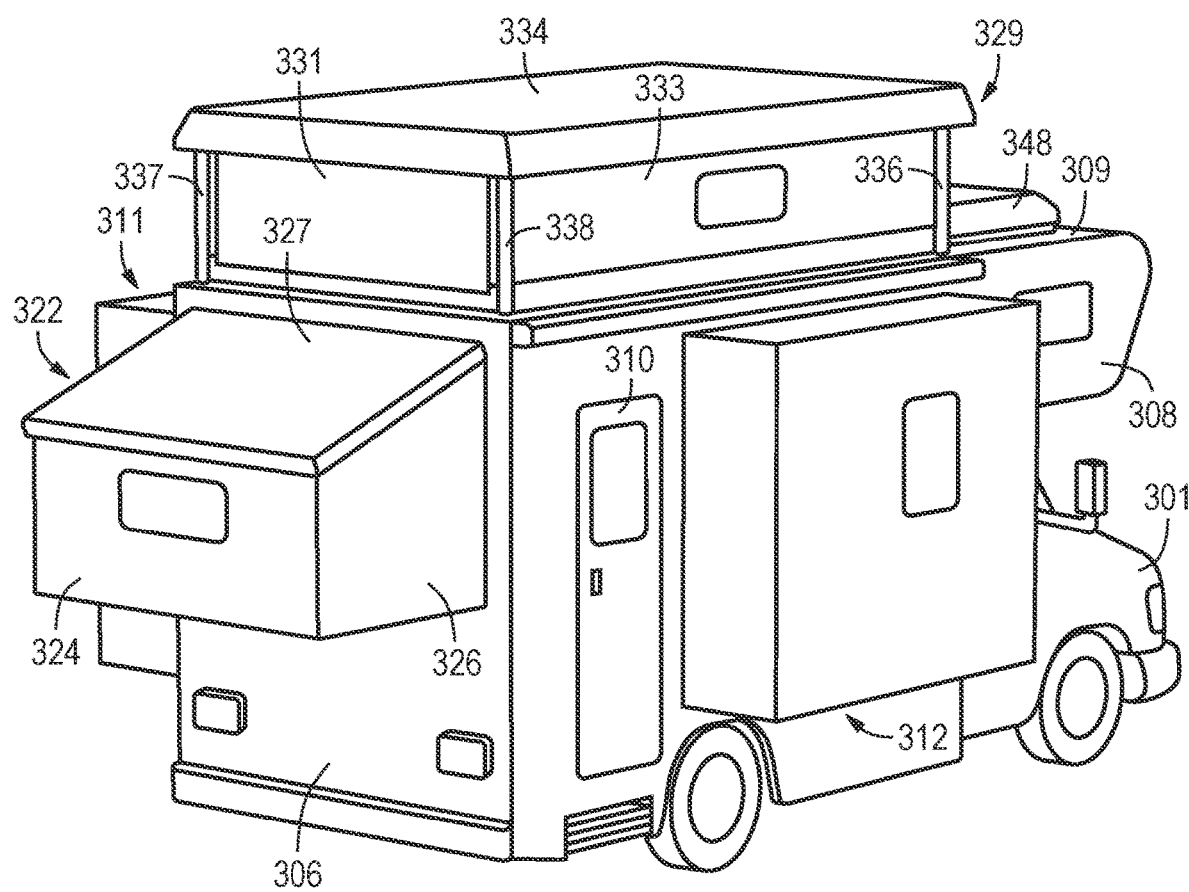
FIG. 28 is a perspective view of the third embodiment with slides 311, 312 and retractable rear enclosure 322 extended, and retractable deck cover 334 in an intermediate position.
Figure 29:
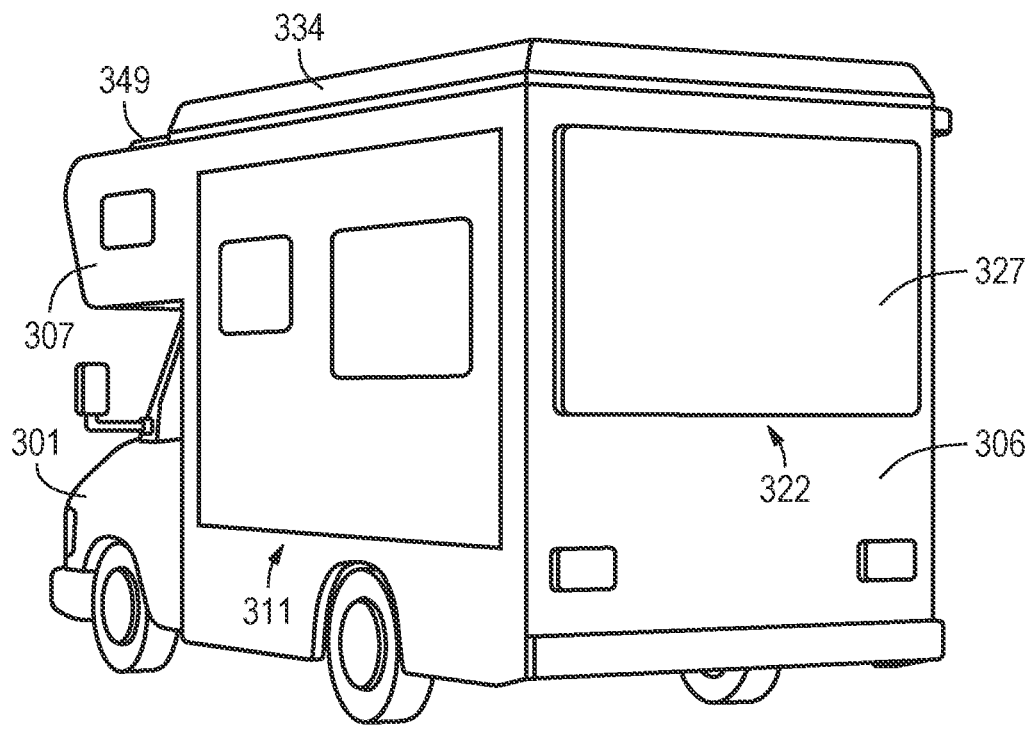
FIG. 29 is a perspective view of the third embodiment with slides 311, 312 and retractable rear enclosure 322 retracted, and retractable deck cover 334 in its lowest position.
Figure 30:
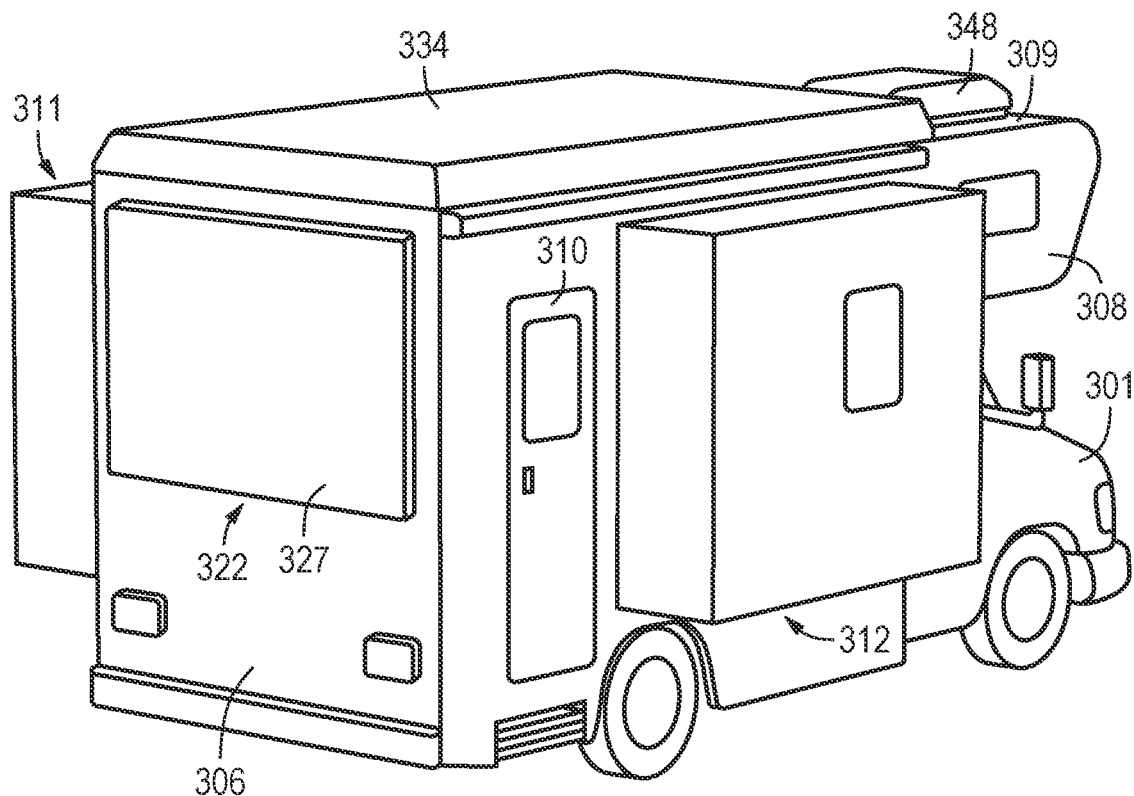
FIG. 30 is a perspective view of the third embodiment with slides 311, 312 extended, retractable rear enclosure 322 retracted, and retractable deck cover 334 in its lowest position.
Figure 33:
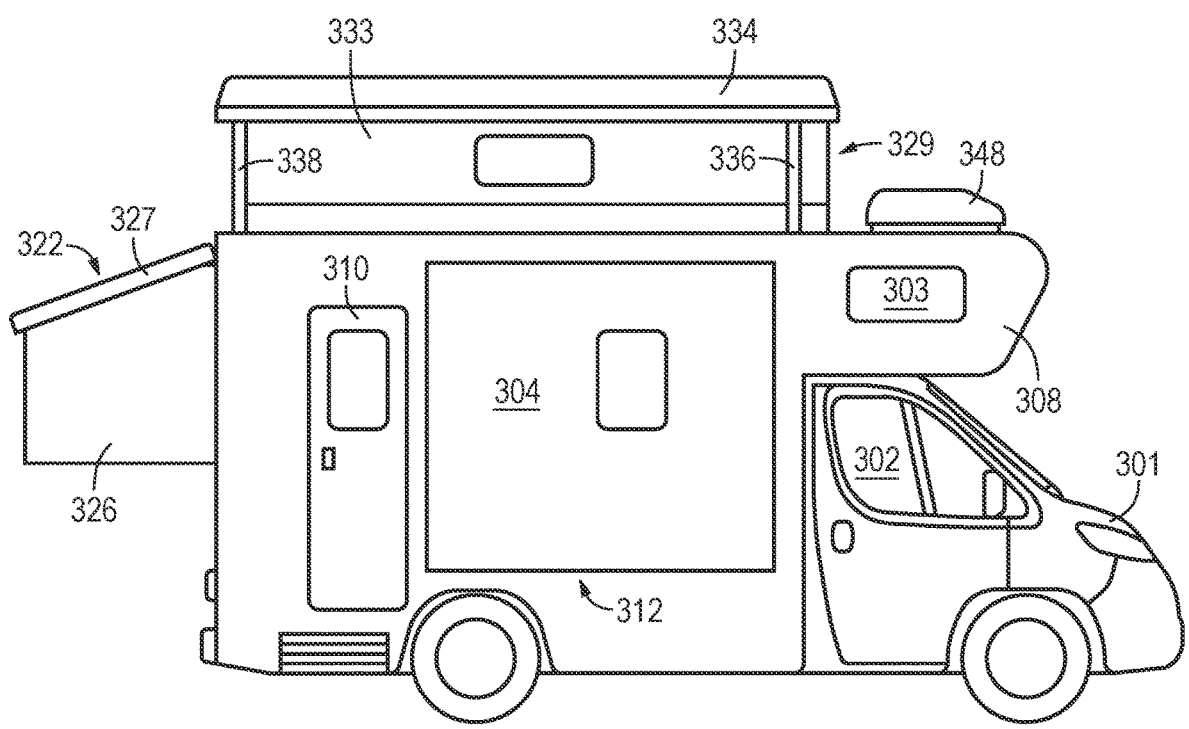
FIG. 33 is a right side view of the third embodiment with retractable rear enclosure 322 extended, and retractable deck cover 334 in an intermediate position.
Figures 34, 35:
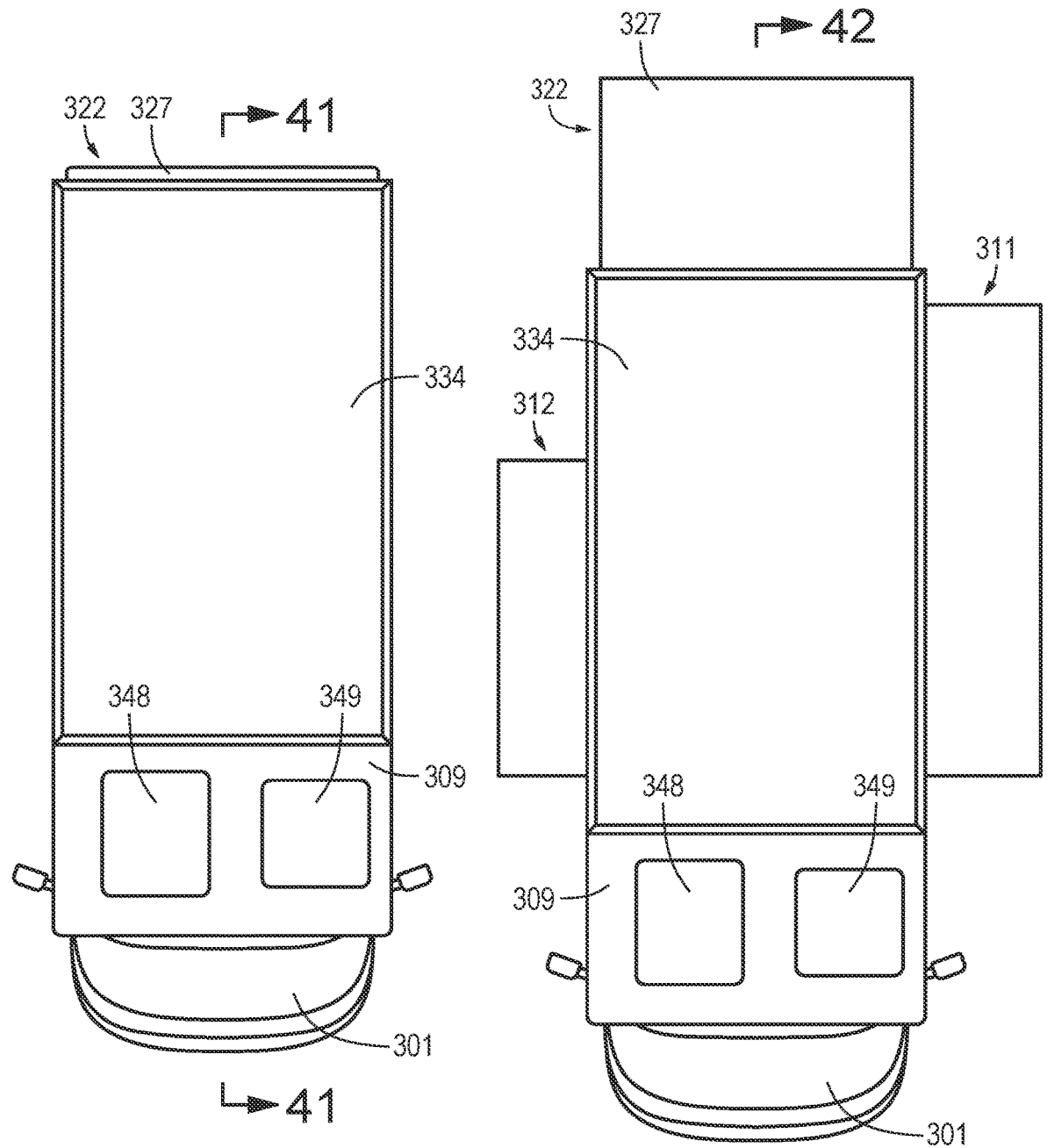
FIG. 34 is a top view of the third embodiment with slides 311, 312 and retractable rear enclosure 322 retracted.
FIG. 35 is a top view of the third embodiment with slides 311, 312 and retractable rear enclosure 322 extended.
Figure 38:
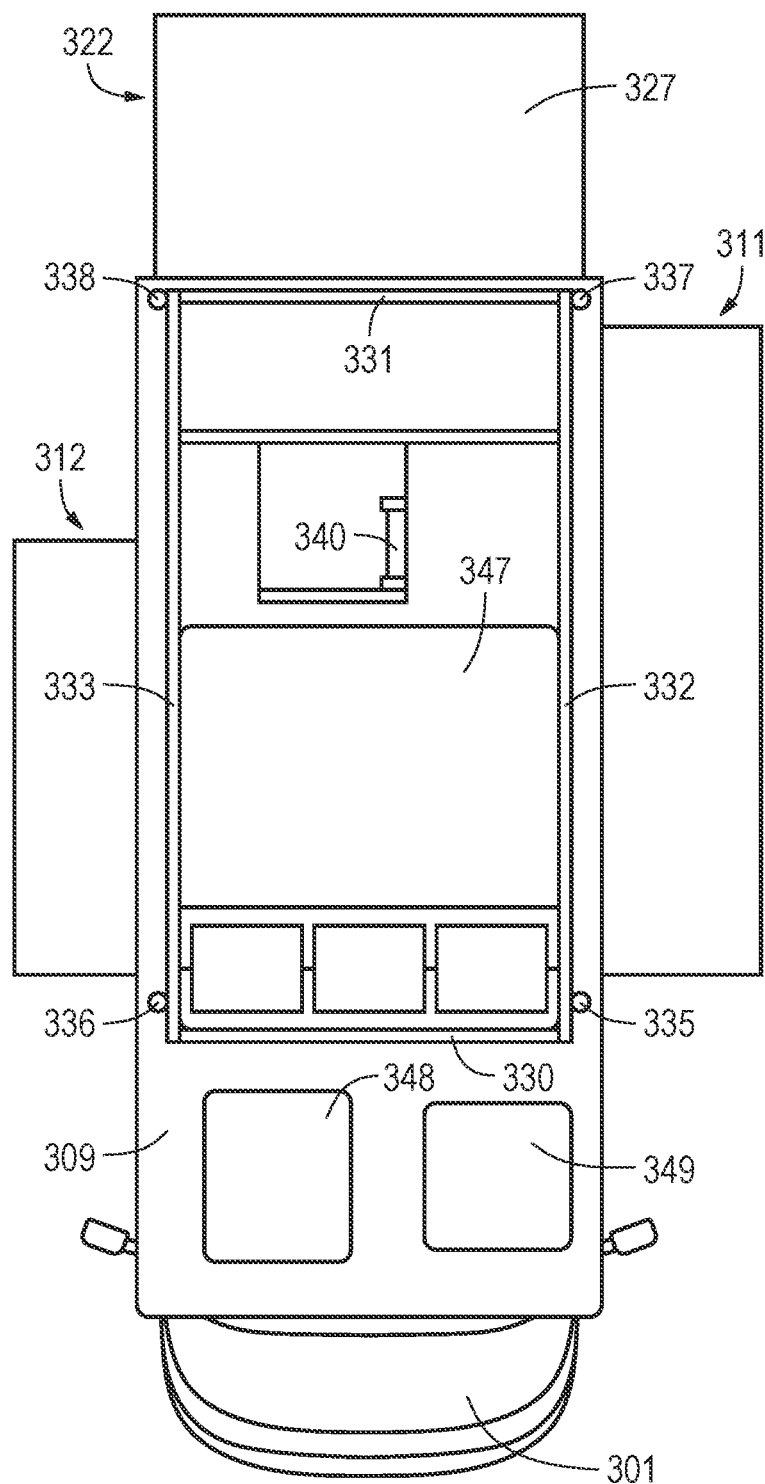
FIG. 38 is a plan view of the deck of the third embodiment with slides 311, 312 and retractable rear enclosure 322 extended, and hinged panels 330, 331, 332, 333 in their raised positions, with king-size mattress 347 set up for sleeping.

The motorhome is shown with retractable deck cover 334 in an intermediate position in FIGS. 28, 33 and 42. FIGS. 38 and 42 show mattress 347 set up for three people. FIG. 42 also shows all of the other mattresses and beds set up for use to give a total sleeping capacity of 12.

Figure 36:
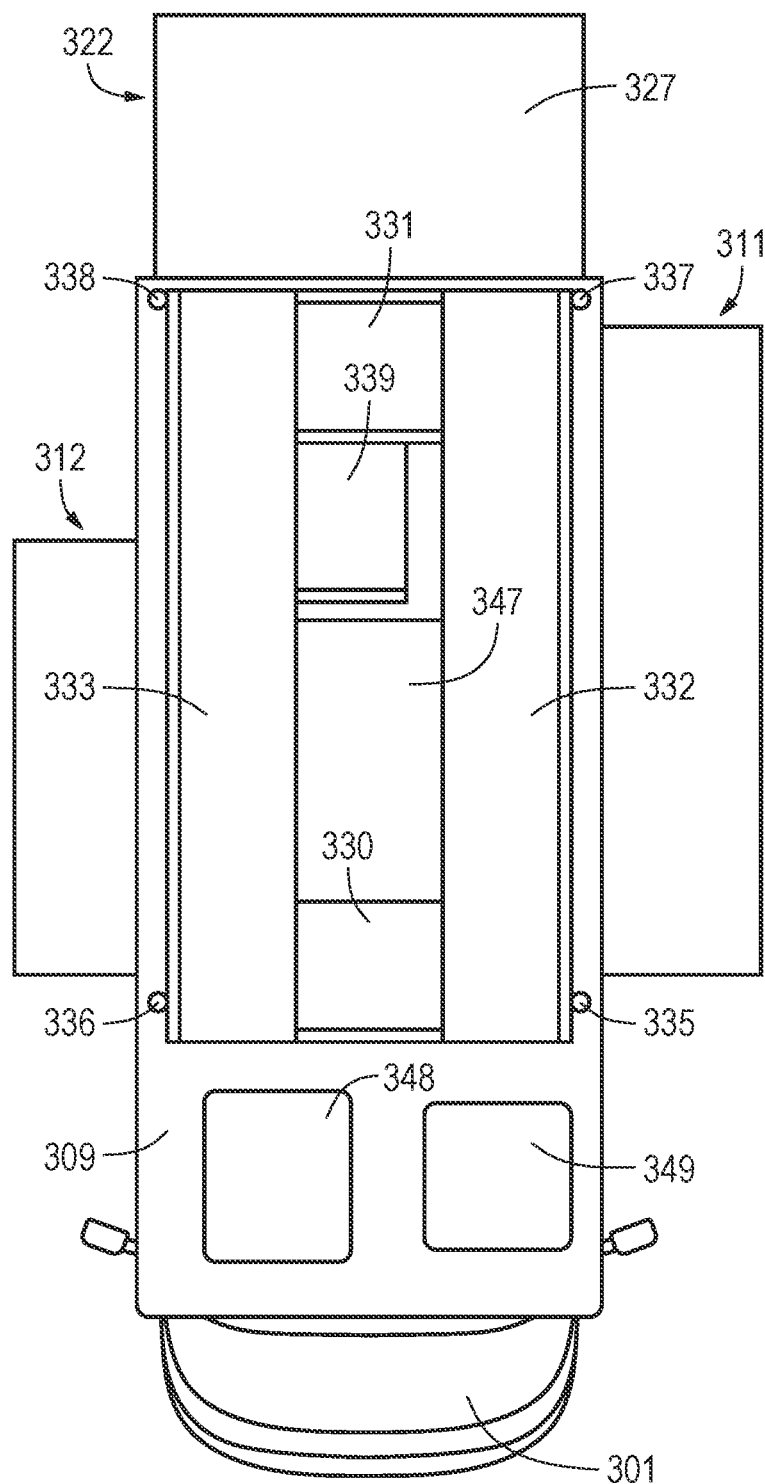
FIG. 36 is a plan view of the deck of the third embodiment with slides 311, 312 and retractable rear enclosure 322 extended and hinged panels 330, 331, 332, 333 lowered.
Figure 39:
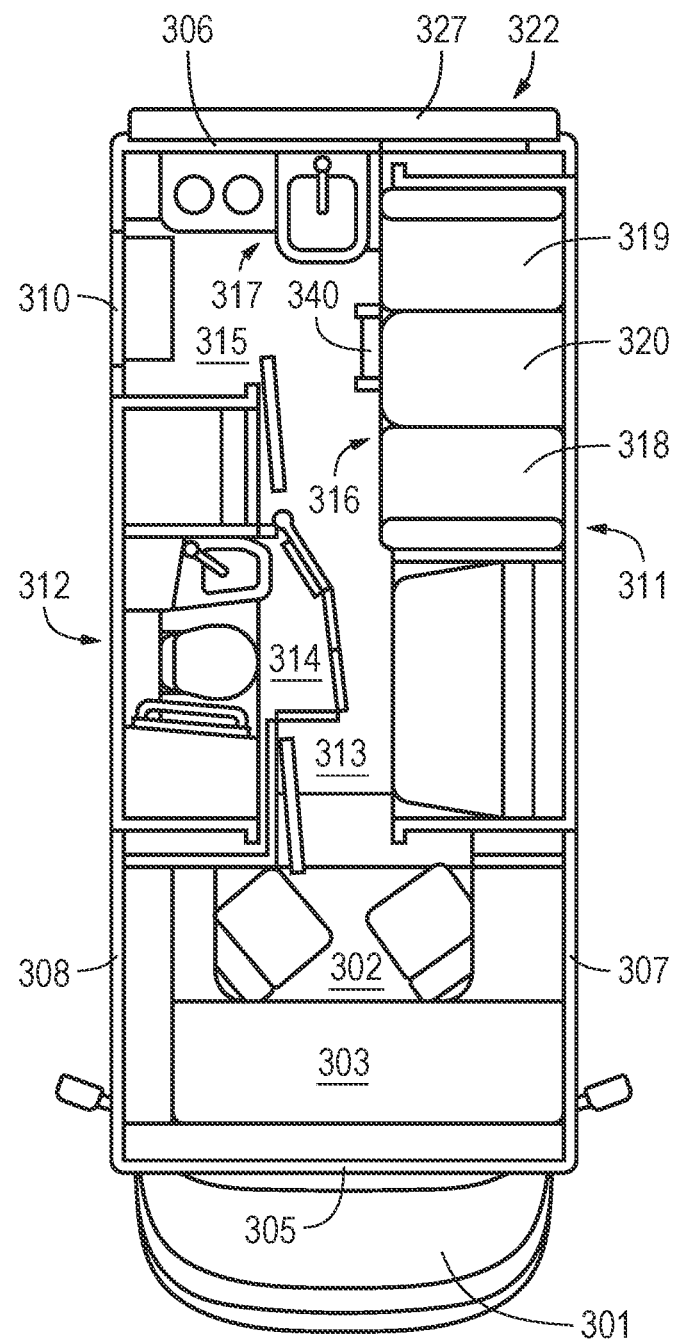
FIG. 39 is a plan view of the interior of the third embodiment with slides 311, 312 and retractable rear enclosure 322 retracted, with deck-access ladder 340 in a vertical position adjacent to dining table 320.

Deck-access ladder 340 may be used in a vertical position as shown in FIGS. 37, 38 and 39, or in an inverted and tilted position as shown in FIG. 40. Each step or rung of ladder 340 may be tapered so that the top side is leveled whether ladder 340 is in a vertical position or in an inverted and tilted position. Ladder 340 may also be moved by a small distance in the directions along the length of the motorhome. FIG. 39 shows ladder 340 positioned close to kitchen unit 317 to facilitate access to forward dinette bench 318 whereas FIGS. 40 and 41 show ladder 340 positioned further forward to allow more room for cooking and washing dishes.
The motorhome is shown with retractable deck cover 334 in its lowest position in FIGS. 29, 30 and 32. In this configuration, mattress 347 may be left extended as shown in FIG. 36 whereas folding table 341 and folding chairs 342, 343, 344, 345 may be stored at the rear end of deck 309.

Description of Fourth Embodiment

FIGS. 43-47 show a fourth embodiment which is a motorhome of approximately 6.1 m (20 feet) in length, 2.3 m (7.6 feet) in width and 3 m (9.9 feet) in height in its fully retracted configuration without an awning, a roof-access ladder or an air conditioner.
The motorhome of the fourth embodiment includes a front end 401, a cab section 402, an over-cab section 403, a main floor 404, a rear end wall 405, a left slide 406, and a right slide 407. Cab section 402 and over-cab section 403 are similar to cab sections 102, 202 and 302, and over-cab sections 103, 203 and 303 of the previous embodiments in the respective order.

Left slide 406 is similar to left slides 115, 212 and 311 of the previous embodiments whereas right slide 407 is substantially larger than right slides 116, 213 and 312 of the previous embodiments. Right slide 407 includes an outer wall 408, a floor 409, a main entry door 410, and retractable steps 411. An awning 412 is attached to outer wall 408 of right slide 407 above main entry door 410.

The motorhome of the fourth embodiment also includes a bedroom 413, a bathroom 414, and a rear lounge 415. Bedroom 413 is similar to bedrooms 142, 214 and 313 of the previous embodiments whereas bathroom 414 is similar to bathroom 215 of the second embodiment. Rear lounge 415 is expandable into a substantially larger area than rear lounges 144, 216 and 315 of the previous embodiments.

Rear lounge 415 contains a dinette 416 and a kitchen unit 417. Dinette 416 includes a forward dinette bench 418, a rear dinette bench 419, and a dining table 420, and can be converted into a couch or a bed in the usual manner.

Figure 46:
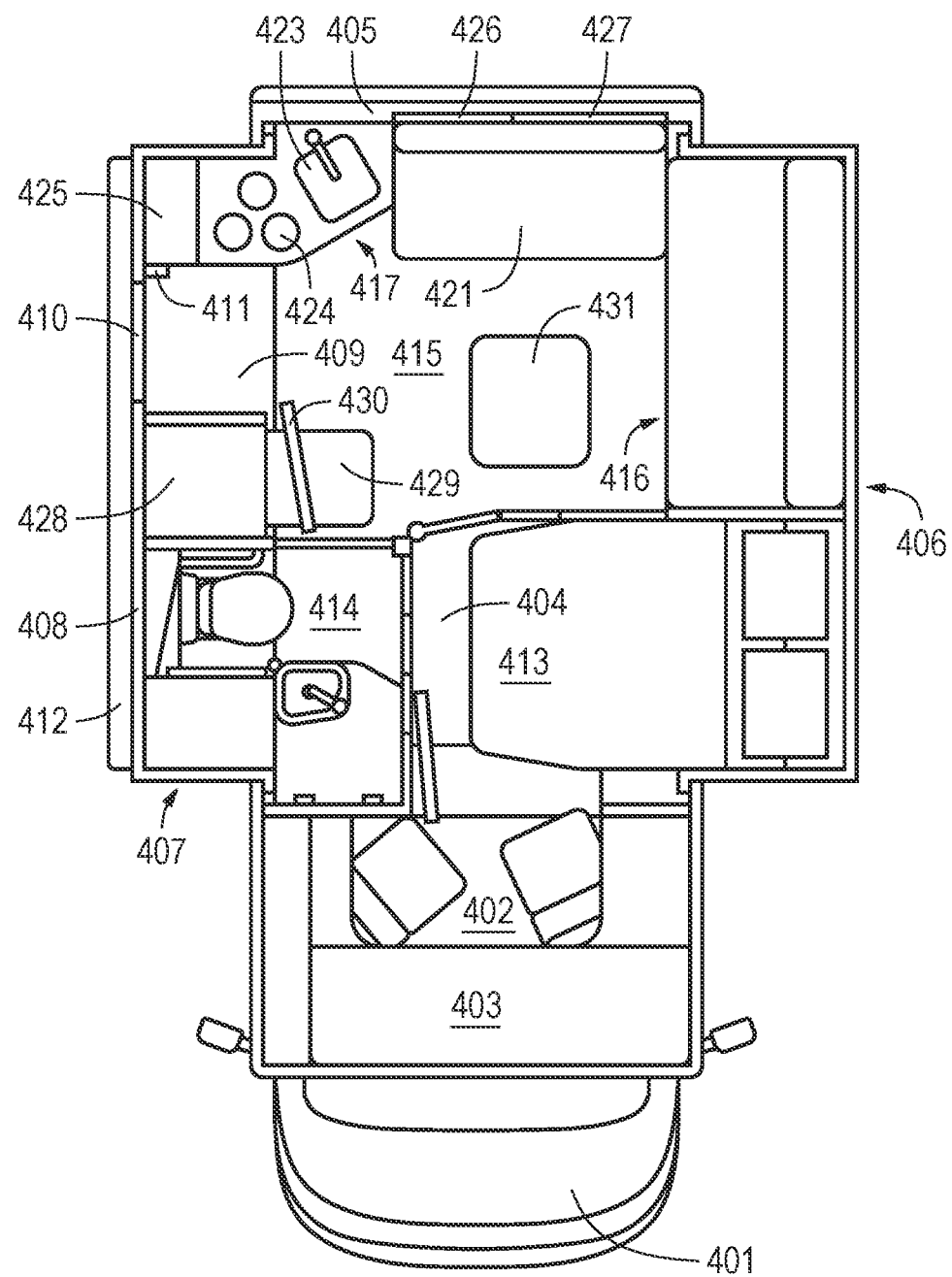
FIG. 46 is a plan view of the fourth embodiment with slides 406, 407 extended, dinette 416 configured as a couch, and foldable couch 421 set up for use.
Figure 47:
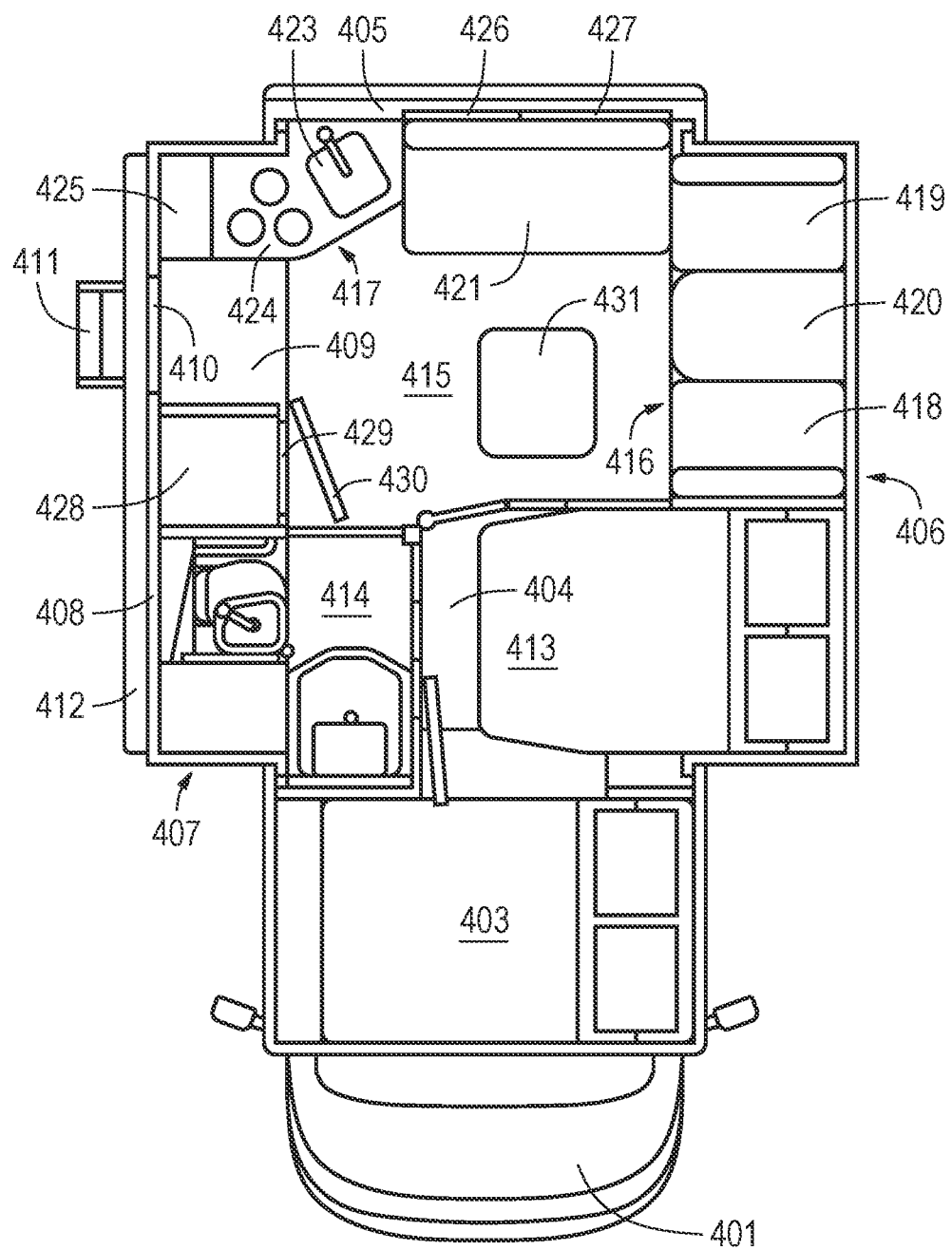
FIG. 47 is a plan view of the fourth embodiment with slides 406, 407 extended, dinette 416 configured for dining, and foldable couch 421 set up for use.

Rear lounge 415 also contains a foldable couch 421 which can be set up for use when slides 406, 407 are in their extended positions, or folded and stored in an under-floor storage compartment 422 in the same way as recliners 194, 251 and 321 of the previous embodiments. FIG. 46 shows couch 421 set up for use with dinette 416 set up as another couch. FIG. 47 shows couch 421 set up for use with dinette 416 configured for dining. Couch 421 can also be extended into a double bed so that the motorhome can sleep up to eight adults with a drop-down bed installed above dinette 416.

Figure 44:
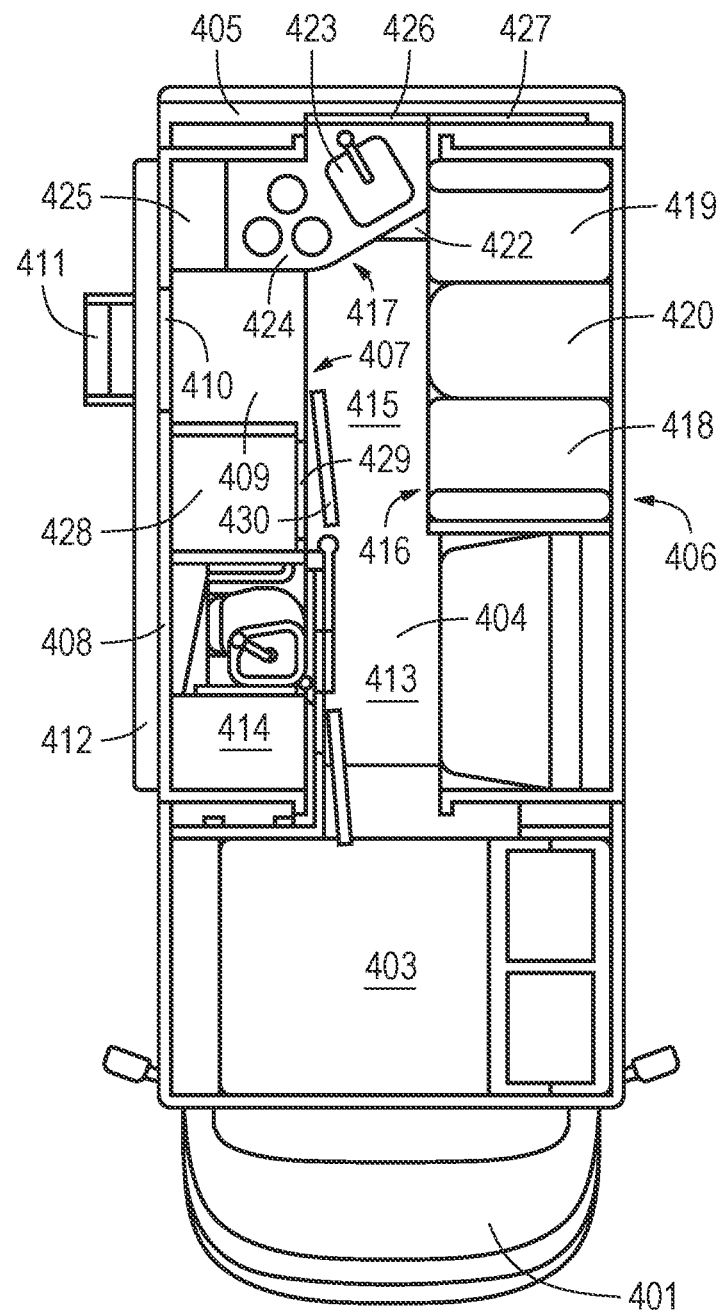
FIG. 44 is a plan view of the fourth embodiment with slides 406, 407 retracted and dinette 416 configured for dining.
Figure 45:
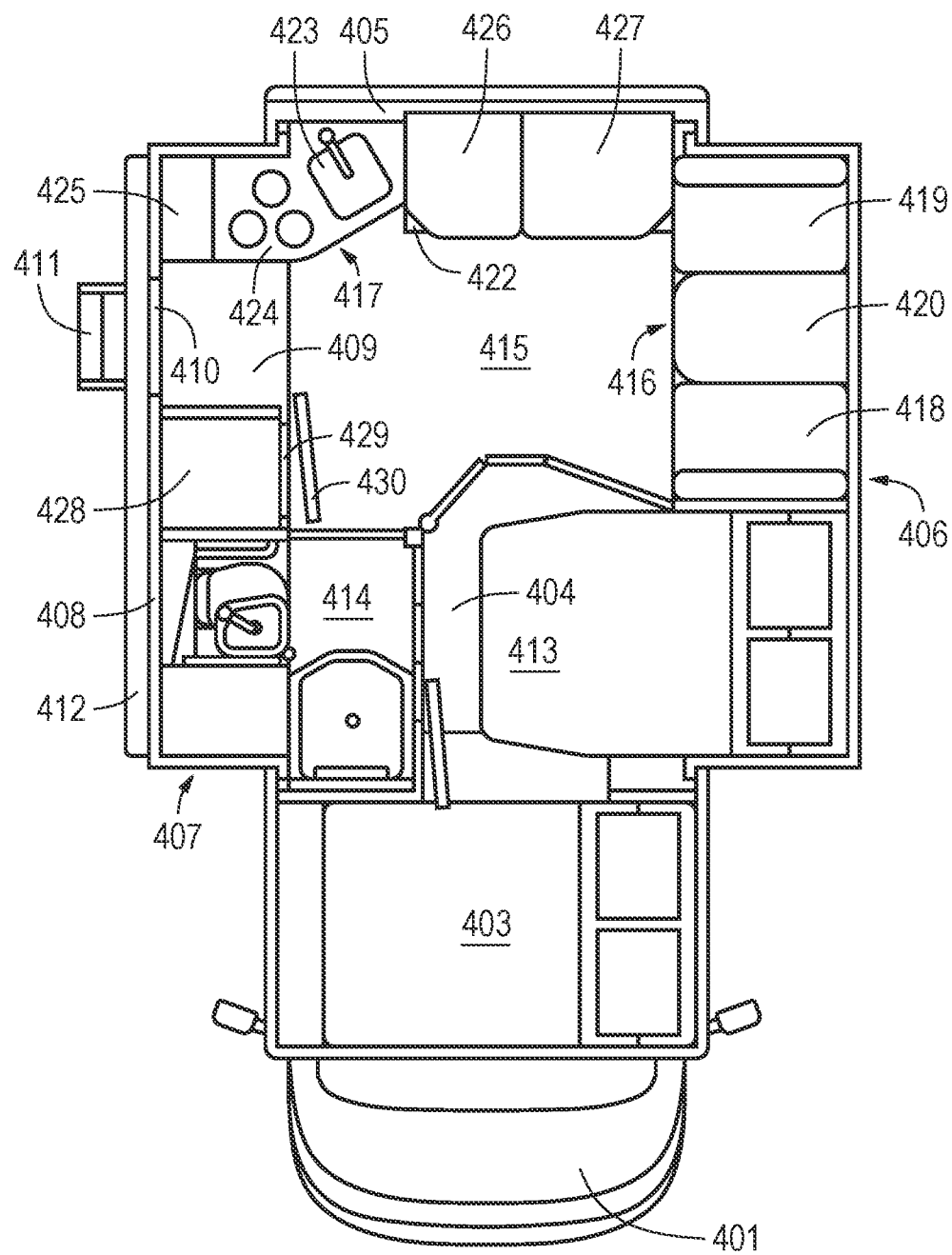
FIG. 45 is a plan view of the fourth embodiment with slides 406, 407 extended, dinette 416 configured for dining, and retractable worktops 426, 427 raised for cooking.

Kitchen unit 417 includes a sink 423, a 3-burner stove 424, and a fixed worktop 425 which are parts of right slide 407. Two retractable worktops 426, 427 are hinged to rear end wall 405 and can be raised for use when slides 406, 407 are in their extended positions. FIGS. 44, 46 and 47 show retractable worktops 426, 427 in their lowered positions whereas FIG. 45 shows them in their raised positions. It is also possible to raise worktop 426 for cooking while keeping worktop 427 lowered so that more than half of couch 421 remains usable.

Steps 411 can be extended for use as shown in FIGS. 43, 44, 45 and 47, or pivoted upwards and slid under fixed worktop 425 for storage as shown in FIG. 46. Alternatively, steps 411 may be stored in a recess on the outside of outer wall 408 of right slide 407. Steps 411 may be easily removable and manually operated or motorized with the use of one or more electric motors. This type of steps makes it possible for the main entry door to be positioned close to the right rear wheel or wheels and can also be installed in any of the previous embodiments with the right slide extended further rearwards. A foldable handrail may be attached to outer wall 408 of right slide 407 rearward of main entry door 410. When there is insufficient space to extend steps 411, the occupants can still enter and exit the motorhome through cab section 402.

Right slide 407 also includes a refrigerator 428, a third retractable worktop 429 and a lounge television 430. Refrigerator 428 is installed with its doors facing rearwards and may have door hinges on both sides so that its contents can be easily accessed from the outside of the motorhome as well as from the inside. Third retractable worktop 429 is shown in its lowered position in FIGS. 44, 45 and 47 and shown in its raised position in FIG. 46. A removable coffee table 431 is also provided as shown in FIGS. 46 and 47 and may be height adjustable so that it can be used as another worktop for food preparation.

This embodiment has substantially more lounge space than the previous embodiments even though it requires the occupants to traverse the interior of right slide 407 to enter or exit the motorhome through rear lounge 415. The additional space makes it possible to use dinette 416 and couch 421 at the same time to seat up to seven adults with an option for having a very large worktop area for cooking when couch 421 is not in use.

Each embodiment shown in this application is a left-hand-drive or right-hand-traffic version of the present invention with the main entry door on the right side so that the left slide is the bedroom-side slide and the right slide is the bathroom-side slide. The disclosed floor plans or layouts may be reversed for the right-hand-drive or left-hand-traffic versions in the usual manner.

It should be noted that the expandable motorhome system herein, has other applications potentially, and one skilled in the art could discover these or discern such on reading this disclosure. The description of the features and employment of this invention does not limit the claims of this application and applications for the device and system herein developed by those skilled in the art will be included in this invention.

The present invention provides simple solutions to the confined space of motorhomes by arranging as many desirable amenities as possible in a motorhome in a configuration which is small enough to be easily driven and parked on most public roads. Each embodiment of the present invention provides a usable interior for a motorhome which is larger than motorhomes of conventional configuration.

The floor plans or layouts disclosed in this application may be adapted for other types of recreational vehicles such as campervans and caravans or trailers. In some cases, the front and the rear ends may be reversed so that the kitchen and the dinette are in the front and the bedroom and bathroom are at the rear end of the vehicle.

Further, while all of the fundamental characteristics and features of the motorhome system invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions as would occur to those skilled in the art are included within the scope of the invention as defined by the following claims.

What is claimed is:

1. A recreational vehicle comprising:
a main floor (141);
a first room (142) positioned on said main floor (141) to one side of said recreational vehicle;
a bathroom (143) positioned on said main floor (141) laterally opposite to said first room (142), said bathroom including a bathroom floor (167), a sink (168) and a toilet (171);
a bathroom-side retractable room extension (116) comprising an outer wall (122) separating said bathroom (143) from the exterior of said recreational vehicle, said bathroom-side retractable room extension (116) moveable from a retracted position into an extended position which substantially expands said bathroom (143) outwards towards the exterior of said recreational vehicle;
a movable partition (149, 156) for separating said bathroom (143) from said first room (142), said movable partition (149, 156) moveable from a retracted position into an extended position within an area previously occupied by said first room (142) to thereby enclose a section of said area within said bathroom (143), thereby substantially expanding said bathroom (143) inwards within the interior of said recreational vehicle; and
wherein said movable partition (149, 156) in said extended position expands said bathroom floor (167) for the use of said sink (168) and said toilet (171) when said bathroom-side retractable room extension (116) is in said retracted position.

2. The recreational vehicle of claim 1, wherein said bathroom-side retractable room extension (116) is a bathroom-side slide (116) which is slidably movable over said main floor (141).

3. The recreational vehicle of claim 2, wherein the outward extension of said bathroom-side slide (116) from a retracted position thereof into an extended position thereof uncovers a section of said bathroom floor (167).

4. The recreational vehicle of claim 3, wherein said bathroom-side slide (116) includes said toilet (171).

5. The recreational vehicle of claim 4, wherein said bathroom (143) includes a shower pan (172).

6. The recreational vehicle of claim 5, wherein said bathroom-side slide (116) is positioned above said bathroom floor (167) and said shower pan (172) when said bathroom-side slide (116) is in the retracted position.

7. The recreational vehicle of claim 5, wherein said bathroom-side slide (116) includes a wardrobe (174) which is positioned above said shower pan (172) when said bathroom-side slide (116) is in the retracted position.

8. The recreational vehicle of claim 5, wherein said movable partition (149, 156) comprises a plurality of hinged panels (150, 151, 152, 157, 158).

9. The recreational vehicle of claim 5, further including a third room (144) positioned adjacent to said first room (142) and said bathroom (143).

10. The recreational vehicle of claim 9, wherein said movable partition (149, 156) includes a first door (149) and a second door (156), and wherein said second door (156) is employable for separating said first room (142) from said third room (144).

11. The recreational vehicle of claim 9, further including a door (160) for separating said bathroom (143) from said third room (144).

12. The recreational vehicle of claim 9, wherein said first room (142) is a bedroom (142) containing a bed (162) and said third room (144) is a lounge (144) containing a dinette (178) and a kitchen unit (179).

13. The recreational vehicle of claim 12, further including a bedroom-side slide (115) containing said bed (162) and said dinette (178).

14. The recreational vehicle of claim 13, further including a cab section (102) positioned forward of said bedroom (142) and said bathroom (143), said cab section containing a front seat (135); and wherein said lounge (144) is positioned rearward of said bedroom (142) and said bathroom (143).

15. The recreational vehicle of claim 13, further including a movable seat (194), wherein the outward extension of said bedroom-side slide (115) from a retracted position into an extended position moves said dinette (178) away from said kitchen unit (179) to make room for said movable seat (194) to be deployed between said dinette (178) and said kitchen unit (179).

16. The recreational vehicle of claim 15, further including an under-floor storage compartment (195) accessible from said lounge (144) for storage of said movable seat (194).

17. The recreational vehicle of claim 13, further including a retractable worktop (190), wherein the outward extension of said bedroom-side slide (115) from a retracted position into an extended position moves said dinette (178) away from said kitchen unit (179) to make room for said retractable worktop (190) to be deployed between said dinette (178) and said kitchen unit (179).

* * * * *